US012769104B2

(12) United States Patent
Alsheimer et al.

(10) Patent No.: US 12,769,104 B2
(45) Date of Patent: Oct. 20, 2026

(54) IMAGING SYSTEM COMPRISING A SAMPLE MOVING UNIT AND AT LEAST ONE ILLUMINATION OPTIC AND IMAGING METHOD

(71) Applicant: LEICA MICROSYSTEMS CMS GMBH, Wetzlar (DE)

(72) Inventors: Soeren Alsheimer, Wetzlar (DE); Joachim Bradl, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 223 days.

(21) Appl. No.: 18/698,024

(22) PCT Filed: Sep. 30, 2022

(86) PCT No.: PCT/EP2022/077379

§ 371 (c)(1),
(2) Date: Apr. 3, 2024

(87) PCT Pub. No.: WO2023/057349

PCT Pub. Date: Apr. 13, 2023

(65) Prior Publication Data

US 2024/0402475 A1 Dec. 5, 2024

(30) Foreign Application Priority Data

Oct. 5, 2021 (EP) .................................... 21201008

(51) Int. Cl.
*G02B 21/00* (2006.01)
*G01N 15/1434* (2024.01)
*G02B 21/26* (2006.01)

(52) U.S. Cl.
CPC ....... *G02B 21/008* (2013.01); *G01N 15/1434* (2013.01); *G02B 21/0032* (2013.01);
(Continued)

(58) Field of Classification Search
CPC . G01N 2015/1445; G02B 21/10; G02B 21/18
See application file for complete search history.

(56) References Cited

U.S. PATENT DOCUMENTS 7,554,725 B2 6/2009 Stelzer et al.
8,619,237 B2 12/2013 Hillman et al.
(Continued)

FOREIGN PATENT DOCUMENTS

DE 102019123324 A1 3/2020
DE 102019214929 A1 4/2021
(Continued)

OTHER PUBLICATIONS

Kaufmann, Anna et al.; "Multilayer mounting enables long-term imaging of zebrafish development in a light sheet microscope"; *Development*; Sep. 1, 2012; pp. 3242-3247; vol. 139, No. 17; The Company of Biologists Ltd; Cambridge, UK.

*Primary Examiner* — Paul C Lee
(74) *Attorney, Agent, or Firm* — LEYDIG, VOIT & MAYER, LTD.

(57) ABSTRACT

An imaging system for imaging a sample includes a sample moving unit configured to move the sample in a sample space along a movement direction. The imaging system further includes at least one detection optic including an optical axis enclosing a first angle with the movement direction within a range of 20° to 70°, the optical axis of the at least one detection optic and the movement direction defining a first plane; and at least one illumination optic including an optical axis that encloses a second angle with the movement direction within a range of 70° to 110°, and that encloses a third angle with the optical axis of the at least one detection optic within a range of 70° to 110°, the optical axis of the at least one illumination optic and the movement
(Continued)

direction defining a second plane, the first and second planes intersecting and being different.

19 Claims, 21 Drawing Sheets

(52) U.S. Cl.
CPC ......... *G02B 21/0076* (2013.01); *G02B 21/26* (2013.01); *G01N 2015/1445* (2013.01)

(56) References Cited

U.S. PATENT DOCUMENTS

2017/0302827 A1* 10/2017 Shimada ................ C12M 41/36
2020/0096754 A1 3/2020 Brinkman
2020/0284715 A1* 9/2020 Kalkbrenner ...... G02B 21/0032
2020/0376488 A1 12/2020 Wu et al.

FOREIGN PATENT DOCUMENTS

WO 2004/053558 A1 6/2004
WO 2010/012980 A1 2/2010

* cited by examiner

IMAGING SYSTEM COMPRISING A SAMPLE MOVING UNIT AND AT LEAST ONE ILLUMINATION OPTIC AND IMAGING METHOD

CROSS REFERENCE TO RELATED APPLICATIONS

This application is a U.S. National Phase application under 35 U.S.C. § 371 of International Application No. PCT/EP2022/077379, filed on Sep. 30, 2022, and claims benefit to European Patent Application No. EP 21201008.6, filed on Oct. 5, 2021. The International Application was published in English on Apr. 13, 2023 as WO 2023/057349 A1 under PCT Article 21(2).

FIELD

The invention relates to an imaging system for imaging a sample. The invention further relates to a method for imaging a sample.

BACKGROUND

The imaging of samples, for example biological samples, non-biological specimen or analytes, has important use cases in the life sciences, diagnostics, bioprocessing, and healthcare. In particular, the imaging of biological samples is a key tool for basic and translational research, and an important pillar of diagnostics and healthcare. Further, imaging is an important tool in the quality control and process development in the context of bioprocessing. For example, one important problem is the selection of clones that produce desired biologics, their culture, quality control and quality assurance. Likewise, there is a need for solutions that allow the three-dimensional imaging of fixed specimens such as tissue biopsies or tissue sections or living specimens, so called live imaging. Similarly, three-dimensional cell culture samples, for example spheroids, tumoroids, organoids, cardioids, and brain organoids, are of great interest in basic and translational research. They hold the promise of being of higher physiological relevance, i.e. findings obtained from them are expected to translate well to humans. This is especially true for patient-derived three-dimensional cell culture models. Three-dimensional cell cultures may be generated using scaffolds, which are typically hydrogels of synthetic or natural origin. Cells seeded in these scaffolds and cultivated with the right set of factors and conditions will develop structures that bear stunning resemblance of endogenous tissues.

In many of these applications it is desirable to find ways to image samples at high speeds, with a high throughput, at high spatial resolution, and with a high number of markers. An imaging system suited to image (single) cells for example with (ultra-) high throughput and high spatial resolution (i.e. in the range of 300 to 500 nm lateral resolution or better) may be used to study cellular morphology and behavior, cell division patterns, and growth kinetics, the subcellular location of proteins for a large number of cells or events (e.g. 10,000 s to 100,000 s of cells, 100,000 s to 1,000,000 s of cells, or 1,000,000 s to 10,000,000 s of cells). Such an imaging system is ideally suited to find few cells displaying a desirable phenotype such as a certain behavior (e.g. killing tumor cells) or a certain desirable combination of traits. In the context of cell line development and bioprocessing applications such a system may be used to, for example, identify and isolate single cells or clones that strongly produce a certain biologic, like an antibody, i.e. are suited to reach a high titer of the desired biologic. Further such a system may be used to analyze a large number of single cells or clones to make predictions about relevant parameters in bioprocessing applications like for example expected titer, growth kinetics, or potential aggregation of the produced biologic. In the context of cell therapy applications such a system may be used for deep phenotypic characterization of a large number of clones. This may involve live imaging of the cells to assess their phenotype (e.g. activity, shape, length of filopodia and lamellipodia, number, shape and dynamics of subcellular organelles like mitochondria, mitotic activity, number, shape, duration of cell-to-cell contacts, killing effectiveness in killing assays), and/or their genome, and/or their transcriptome, and/or their proteome, and/or their metabolome.

Fluorescence microscopy is commonly used in such applications to label pre-determined structures which may also be named target molecules, molecular markers or analytes inside biological samples. Some molecular markers may also be referred to as biomarkers, when their presence or absence can be connected to a particular biological phenomenon such as for example the level of blood sugar and insulin.

Typical samples are derived from either field collection, a biopsy or a cell culture. The size of a typical sample may be in the range of a couple microns, for example a single cell, tens or hundreds of µm, for example a three-dimensional cell culture sample like a group of cells, a spheroid, an organoid or a tumoroid, or even in the range of several millimeters, for example large organoids, embryos, or tissue sections and organotypic slices.

For cultivation, sample preparation, and imaging the samples are typically maintained in dedicated labware, for example slides, dishes, microplates, and flasks. Especially for fluorescence microscopy with objectives that have a high numerical aperture it is required that the vessel containing sample has a substantially transparent window.

For this reason, there exist a large number of sample carriers, such as petri dishes, chamber slides, flow cells, microplates comprising one or more vessels for receiving samples, for example wells or fluidic channels, which have substantially transparent bottom that allows the imaging of samples inside the vessel from below, e.g. with an inverse microscopical setup. This bottom window is generally made of glass or of a material with a similar refractive index. Such sample carriers will also be referred to as imaging plates in the following.

Although imaging from below is generally desirable, some geometries preclude the use of high numerical aperture objectives, when trying to image upright, i.e. from above, due to sterical problems as well as reflections, and the meniscus which typically forms at the upper surface of the liquid contained in a well due to surface tension.

For example, a compact light sheet fluorescence microscope has been disclosed DE 10 2019 214 929 A1, which illuminates the sample at angle substantially different from 0° to a reference plane. However, the setup is not compatible with imaging sample from below through the bottom of an imaging plate.

The aforementioned restrictions are the reason why the bulk of light sheet microscopy today is either performed by bringing in the illumination and detection optic into a sample chamber from the top, and at least partially immersing the front lenses of the detection optic. In this case, the sterical requirements necessitate the use of large petri dishes and preclude the use of small vessels, for example the well of a 96-well microplate, since the illumination and detection optic would not fit into these wells. Alternatively, microscope systems are used, which are similar to the original SPIM design as disclosed in WO 2004/053558 A1. In this case, the samples are typically mounted and then brought into the sample chamber from the top to hang in front of the front lens. This may be brought about by using agarose gel rods that are pushed out a few millimeters from a glass capillary or by mounting samples in hydrogels inside fluorinated ethylene propylene (FEP) tubes as disclosed in Kaufmann et al. 2012 Development 139(17):3242-7.

However, the known microscope systems suffer either from having a low throughput or having a low spatial resolution. Many known microscope systems having a high throughput are not capable of volumetric imaging, i.e. three-dimensional imaging.

SUMMARY

In an embodiment, the present disclosure provides an imaging system for imaging a sample. The imaging system includes a sample moving unit configured to move the sample in a sample space along a movement direction; at least one detection optic including a detection optical axis that encloses a first angle with the movement direction within a range of 20° to 70°, the detection optical axis of the at least one detection optic and the movement direction defining a first plane; and at least one illumination optic including an illumination optical axis that encloses a second angle with the movement direction within a range of 70° to 110°, and that encloses a third angle with the detection optical axis of the at least one detection optic within a range of 70° to 110°, the illumination optical axis of the at least one illumination optic and the movement direction defining a second plane, the first and second planes intersecting and being different.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
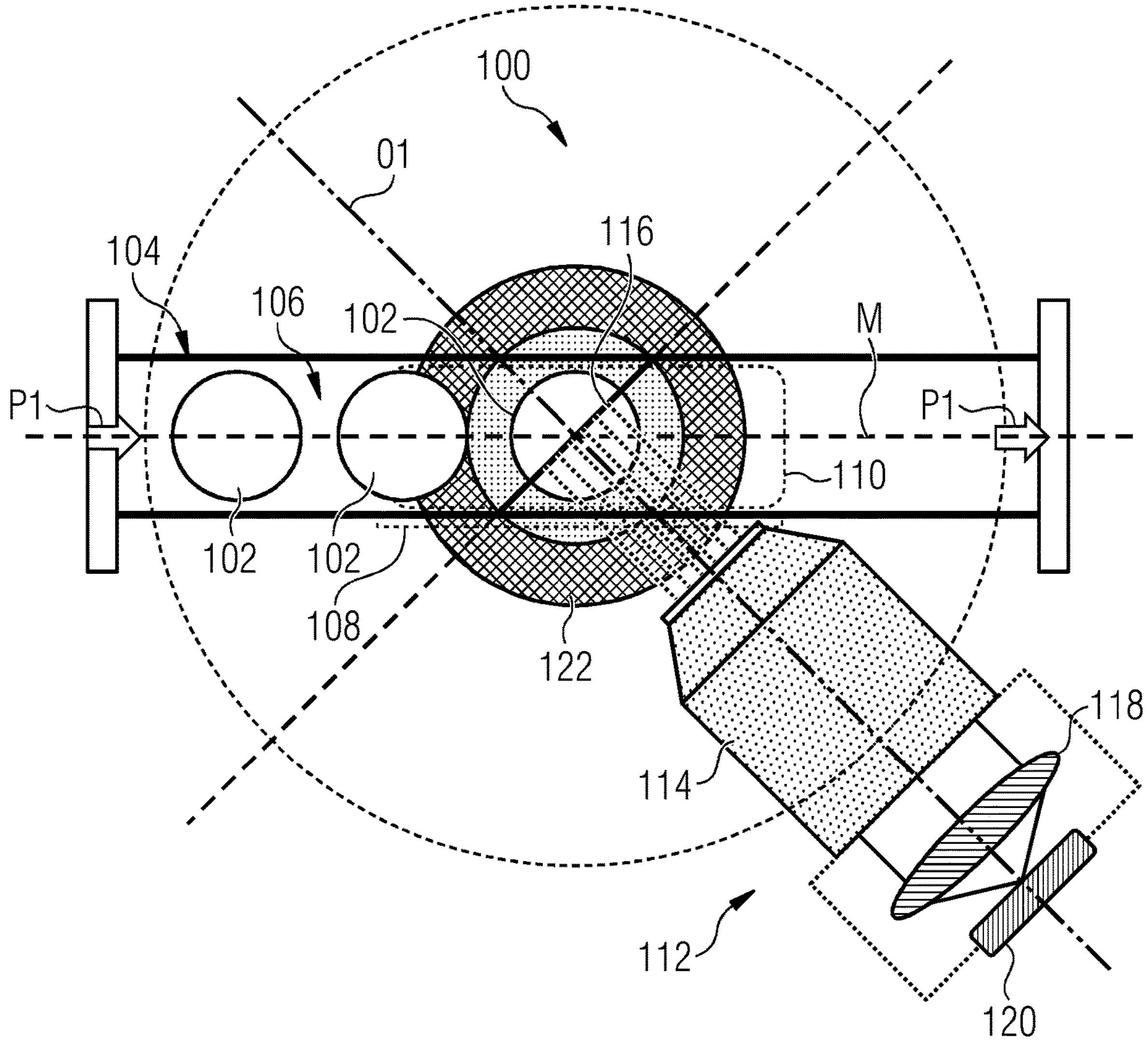
FIG. 1 is a schematic view of an imaging system for imaging a sample according to an embodiment of the present invention.

Embodiments of the present invention can provide an imaging system and a method that allow volumetric imaging of a sample with a high throughput. Embodiments of the present invention can be read in conjunction with EP212009992.2, the contents of which are hereby incorporated by reference herein in full.

In the sense of this document "sample" refers to a biological sample which may also be named a biological specimen including, for example blood, serum, plasma, tissue, bodily fluids (e.g. lymph, saliva, semen, interstitial fluid, cerebrospinal fluid), feces, solid biopsy, liquid biopsy, explants, whole embryos (e.g. zebrafish, *Drosophila*), entire model organisms (e.g. zebrafish larvae, *Drosophila* embryos, *C. elegans*), cells (e.g. prokaryotes, eukaryotes, archea), multicellular organisms (e.g. Volvox), suspension cell cultures, monolayer cell cultures, 3D cell cultures (e.g. spheroids, tumoroids, organoids derived from various organs such as intestine, brain, heart, liver, etc.), a lysate of any of the aforementioned, a virus. In the sense of this document "sample" further refers to a volume surrounding a biological sample. Like for example in assays, where secreted proteins like growth factors, extracellular matrix constituents are being studied the extracellular environment surrounding a cell up to a certain assay-dependent distance, is also referred to as the "sample". Specifically, affinity reagents brought into this surrounding volume are referred to in the sense of this document as being "introduced into the sample".

The imaging system for imaging a sample according to an embodiment comprises a sample moving unit configured to move the sample in a sample space along a movement direction. The imaging system has at least one detection optic having an optical axis that encloses an angle with the movement direction within a range of 20° to 70°. The optical axis of the detection optic and the movement direction define a first plane. The imaging system further comprises at least one illumination optic having an optical axis that encloses an angle with the movement direction within a range of 70° to 110°, and that encloses an angle with the optical axis of the detection optic within a range of 70° to 110°. The optical axis of the illumination optic and the movement direction define a second plane. The first and second planes intersect and are different.

By tilting the optical axis of the detection optic relative to the movement direction, the object plane of the detection optic is non-parallel to the movement direction. The illumination optic is arranged such that the object plane of the detection optic can be illuminated by an illumination provided through the illumination optic. Thus, by moving the sample along the movement direction, i.e. through the object plane, different planes within the sample are illuminated and can be imaged with the detection optic. This is also called optical sectioning. Thereby, it becomes possible to acquire a series of images of the sample, each image corresponding to a different plane within the sample. This series of images is also called an image stack and can form the basis for a volumetric, i.e. three-dimensional, image of the sample. In particular, a large number of samples can be moved past the detection optic in quick succession resulting in a high throughput. Thus, the imaging system according to an embodiment allows volumetric imaging of samples with a high throughput. The angle between the at least one detection optic and the movement direction is preferably within a range of 30° to 60°, 40° to 50°, 43° to 47° or it is 45°. Said angle is such that a field of view of the at least one detection optic and the essential part of the cross section of a sample movement volume at or near the detection optic is covered or is suitable to image essentially the complete sample while the sample passes the detection optics when moving along the movement direction.

In a preferred embodiment, the optical axis of the illumination optic is perpendicular to the optical axis of the detection optic, and perpendicular to the movement direction. An illumination, for example a light sheet, that is focused along the optical axis of the illumination optic will illuminate the object plane of the detection optic, in particular if the light sheet is oriented such that the normal vector of the plane of the illumination light sheet is essentially parallel to the optical axis of the detection optic. Thus, this preferred embodiment does not require additional optical elements for aligning the illumination with the object plane of the detection optic. Thus, the imaging system according to this embodiment has a simple optical design and can be manufactured at low cost.

In another preferred embodiment the imaging system comprises a second detection optic, wherein an object plane of the first detection optic and an object plane of the second detection optic intersect within the sample space. The second detection optic can be used to capture an image complementary to an image captured by the first detection optic. The complementary image may be used to image a different perspective or to create a composite image of the sample. Thereby, the versatility of the imaging system is increased.

The second detection optic may in particular be used to enhance the image captured by the first detection optic. The spatial resolution of a detection optic is described by its point spread function which describes how the detection optic images a point object. For a typical objective this point spread function is an ellipsoid that is elongated along the optical axis of the detection optic, i.e. the z-axis. This means that the z or axial-resolution is lower than the x-y or lateral resolution. In this embodiment, the point spread functions of the first and second detection optics overlap and can therefore be combined into a single effective point spread function by means of registration, deconvolution and fusion of the individual images. The effective point spread function then comprises the intersection of the two individual point spread functions. In the case of two detection optics, being e.g. arranged such that their optical axes are oriented perpendicular to each other, the effective point spread function is approximately cube-shaped. The edge length of this cube is approximately equal to the lateral resolution of the two detection optics. Using even more detection optics, for example six detection optics, will result in an effective point spread function that approximates a sphere. Having a spherical effective point spread function corresponds to an isometric resolution, i.e. a comparable spatial resolution in all directions that is approximately equal to the lateral resolution of a single detection optic. Thereby, in this embodiment significant improvement in resolution can be achieved.

In another preferred embodiment, the optical axis of the second detection optic encloses an angle with the movement direction within a range of 20° to 70°, preferably within a range of 30° to 60°, 40° to 50°, 43° to 47° or it is 45°, and encloses an angle with the optical axis of the first detection optic within a range of 70° to 110°, preferably within a range of 80° to 100°, 85° to 95°, 87° to 93° or it is 90°, and encloses an angle with the optical axis of the illumination optic within a range of 70° to 110°, preferably within a range of 30° to 60°, 40° to 50°, 43° to 47° or it is 45°. In this embodiment, the optical axes of the first and second detection optic are preferably nearly perpendicular. Thereby, the arrangement allows the sample to be imaged such that features of the sample hidden in the image captured by the first detection optic are visible in the image captured by the second detection optic and vice versa. Thus, within this range the second detection optic might complement the first detection optic best.

In another preferred embodiment the imaging system comprises a second illumination optic. The optical axis of the second illumination optic encloses an angle with the movement direction within a range of 70° to 110°, preferably within a range of 80° to 100°, 85° to 95°, 87° to 93° or it is 90°, and encloses an angle with the optical axis of the first illumination optic being smaller than 20°. The second illumination optic can be used to provide a complementing illumination in order to improve the image quality of the imaging system.

In another preferred embodiment, the first and second illumination optics are arranged opposite each other. In this embodiment, the arrangement of the first and second illumination optics allows the sample to be illuminated from opposite sides. Thereby, shadowing effects can be reduced.

In another preferred embodiment the imaging system comprises a light sheet illumination unit configured to generate at least one light sheet by directing illumination light through the at least one illumination optic into the sample space for essentially only illuminating the object plane of the detection optic. The light sheet is used to illuminate a thin stripe of the sample. Thereby optical sectioning of the sample is achieved, e.g. by the sampler movement through the illuminated stripe or plane. The light sheet illumination unit allows the imaging system to be used for light sheet microscopy. Light sheet microscopy has many advantages. In particular, light sheet fluorescence microscopy allows imaging of planes deep within samples that would not be accessible otherwise and/or smaller phototoxic illumination compared to for example white-field microscopic illumination. Thus, the imaging system according to this preferred embodiment may in particular be used to generate volumetric images of thick samples. The generation of the at least one light sheet can be made at the object plane of the detection optic parallel to the object plane of the detection optic, however in the depth of focus of the detection optic.

The light sheet illumination unit may comprise at least one of the following light sources a continuous wavelength laser, a pulsed laser, a white light laser, a semiconductor laser, or an LED illumination. The illumination unit may further be configured for multi-photon excitation.

In particular, (inverted) selective plane of illumination microscopy, SCAPE—as described in e.g. U.S. Pat. No. 8,619,237 B2—and/or OPM—as described e.g. in WO 2010/012980 A1—, or related setups may be used. Several beam profiles including but not limited to Gaussian, sinc2, Bessel beam as well as multi-beam configurations like for example lattice light sheet may be deployed to illuminate a thin stripe of the sample, which overlaps at least partially with the object plane of at least one detection optic.

In another preferred embodiment, the light sheet illumination unit is configured to generate a second light sheet by directing illumination light through the at least one illumination optic into the sample space, and to alternatingly illuminate the object plane of the first detection optic with the first light sheet and illuminate the object plane of the second detection optic with the second light sheet. By sequentially illuminating the object planes of the first and second detection optics the image quality of images of samples that have more out-of-focus blur, for example large samples, samples with more autofluorescence or more densely labeled samples can be substantially improved. It is possible to illuminate the first and second object plane not in an alternative fashion but simultaneously. However perpendicular parts of the generated illumination light distribution might cause out of focus blur or a detected higher light intensity at local parts of the acquired images, if the first and second illumination light sheets intersect in the sample space. That might result in cross talk contributions of the two images. These artifacts can be removed or corrected by respective computational algorithms.

In another preferred embodiment, the light sheet illumination unit is configured alternatingly direct illumination light through the first illumination optic into the sample space for illuminating the object plane of the first or second detection optic with the first or second light sheet, and through the second illumination optic into the sample space for illuminating the object plane of the first or second detection optic with the first or second light sheet. This preferred embodiment combines the advantages of sequentially illuminating the object planes of the first and second detection optics with the advantages of an illumination from opposite sides. Thereby, large samples, samples with more autofluorescence or more densely labeled samples can be imaged with reduced shadowing effects. Thus, the image quality is further improved. The concept of not alternatively illuminating but simultaneous illuminating the first and second illumination light sheet might apply for this embodiment as well.

In another preferred embodiment, the at least one detection optic comprises an immersion objective. Immersion objectives have a higher numerical aperture compared to dry objectives. Thus, it is possible to achieve a high spatial resolution with an immersion objective compared to an objective being calculated for air as the immersion medium.

In another preferred embodiment, the first plane and the second plane intersect within the sample space. At the intersection of the first and second planes, the object plane of the detection optic is illuminated by the illumination optic. Further, the intersection of the first and second planes preferably is parallel to the movement direction.

In another preferred embodiment, the sample moving unit comprises a flow cell defining the sample space. In this embodiment, the sample is suspended in a flow medium which may be in a liquid or a gas phase. By moving the flow medium through the flow cell, the sample is also moved. Both (micro)fluidic and pneumatic systems may be used to move the flow medium. More than one sample may be suspended in the flow medium. Thereby, flow cells can be used to image a large number samples in quick succession. Thus, this embodiment allows to generate three-dimensional images of a large number of samples in a short time.

In another preferred embodiment, the sample moving unit comprises a movable microscope table, in particular a motorized microscope table. The sample space is defined by a sample carrier arranged on or at the microscope table. In this embodiment, the movement of the sample that results in the sample being optically sectioned during the image acquisition is accomplished by the movement of the microscope table. Thereby, an easy way of generating a three-dimensional image of the sample is provided. The microscope table may in particular comprise one or more stepper motors, linear motors or Piezo drives. Further, the microscope table may allow a translation in x-, y- and z-direction as well tilting and/or rotating the sample, i.e. having up to 6 axes.

In another preferred embodiment, the sample carrier or the flow cell comprises an optical medium in which the sample is received, the optical medium having a first refractive index. The sample carrier or the flow cell further comprises at least one window portion defining two parallel surfaces that comprises an optically transparent material having a second refractive index, and that is arranged at a bottom side of the sample carrier or the flow cell. The first and second refractive indices do not deviate by more than 2.5%. The sample carrier or the flow cell may further contain a second or third window portion through which the sample may be illuminated and at a side where an illumination optic and or a detection optic is located. The second or third window portion may be index-matched, i.e. may be of the second refractive index ("index-matched") when the angle between the axis of the illumination objective(s) and the surface of the second and/or third window portion is substantially non-orthogonal. Alternatively, the second or third window portion may have a different third refractive index, when the angle between the axis of the illumination objective(s) and the surface of the second and/or third window portion is substantially orthogonal.

An optical interface is formed where the optically transparent material of the window portion meats with the optical medium in which the sample is received. Such an optical interface typically results in aberrations, in particular spherical aberrations. The negative effects of the optical interface are even stronger when the sample is imaged at an oblique angle, i.e. when the sample is imaged with a detection optic having an optical axis that encloses an angle with the normal of the (inner and the outer, e.g. the) two parallel surfaces of the window portion that is substantially different from 0°. Typically, this tilt of the optical axis of the detection optic will lead to the rapid degradation of the image, i.e. loss of intensity, coma, spherical aberration and chromatic aberrations.

However, the afore-mentioned negative effects of the optical interface are mainly caused by a difference in refractive indices between the two mediums forming the optical interface. Since the refractive indices of the window portion and the optical medium do not deviate e.g. by more than 2.5%, the negative effects of the optical interface are greatly reduced in this preferred embodiment.

The optical medium may be any optically transparent medium configured to receive the sample. In particular, the optical medium is an embedding medium configured to embed the sample, or a cell culture medium, or a cell culture matrix like for example a hydrogel, or a flow medium configured for use in a flow cell.

In another preferred embodiment, the imaging system is a microscope or an imaging cytometer. Microscopes and imaging cytometers have many important uses, in particular in the life sciences, diagnostics, bioprocessing, and healthcare. The imaging system may therefore be used in a wide range of applications, making it more versatile.

Embodiments of the present invention further relate to a method. The method comprises the following steps: Moving the sample in a sample space along a movement direction. Illuminating the sample with at least one illumination optic having an optical axis that encloses an angle with the movement direction within the range of 70° to 110°, and in a preferred embodiment, within a range of 80° to 100°, 85° to 95°, 87° to 93° or it is 90°, and that encloses an angle with the optical axis of at least one detection optic within the range of 70° to 110°, preferably within a range of 80° to 100°, 85° to 95°, 87° to 93° or it is 90°. Capturing at least one image of the sample with the at least one detection optic having an optical axis that encloses an angle with the movement direction within the range of 20° to 70°. The optical axis of the detection optic and the movement direction define a first plane. The optical axis of the illumination optic and the movement direction define a second plane. The first and second planes intersect and are different.

The method has the same advantages as the sample carrier and the imaging system described above.

FIG. 1 is a schematic view of an imaging system 100 for imaging a sample 102 according to an embodiment.

The imaging system 100 comprises a flow cell 104 that defines a sample space 106. The flow cell 104 is filled with a flow medium in which several samples 102 are suspended. A flow direction of the flow medium is from left to right in FIG. 1 and indicated by two arrows P1. By moving the flow medium through the flow cell 104, the samples 102 suspended in the flow medium are moved along the flow direction P1. Thereby, the flow direction of the flow medium defines a movement direction M of the samples 102 and the flow cell 104 forms a sample moving unit. For observing and illuminating the samples 102, the flow cell 104 comprises two transparent window portions 108, 110. A first window portion 108 is located at a bottom side of the flow cell 104. A second window portion 110 is located at the back side of the flow cell 104 in FIG. 1.

An optical detection system 112 of the imaging system 100 is arranged below the flow cell 104. The optical detection system 112 comprises a detection optic 114, e.g. a microscope objective, configured to capture detection light emitted by the samples 102. The detection optic 114 is directed at the first window portion 108 of the flow cell 104. The optical axis O1 of the detection optic 114 and the movement direction M of the samples 102 enclose an angle of about 45°. Accordingly, the object plane 116 of the detection optic 114 and the movement direction M enclose an angle of about 45° as well. The optical detection system 112 further comprises a tube lens 118 that directs the detection light captured by the detection optic 114 onto a detector element 120. The optical detection system 112 may comprise at least one of the following as the detector element 120 a CMOS camera, a CCD/EM-CCD camera, a spectral camera, a hyperspectral camera, a FDFLIM camera or another time-sensitive detector, a light-field camera, and a (multi) point-/line-scanning unit for confocal imaging. The refractive index of the immersion medium between the detection optic 114 and the first window portion 108 is matched to the refractive index of the first window portion 108 of the flow medium.

Figure 2:
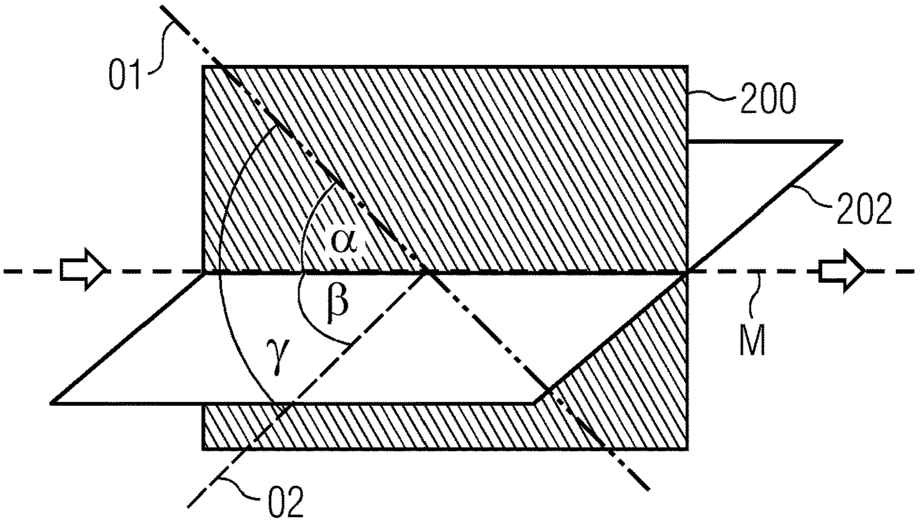
FIG. 2 is a schematic view of the optical axes of the detection optic and the illumination optic and the movement direction of the samples.

The imaging system 100 further comprises an illumination optic 122 arranged at a back side of the flow cell 104 and directed at the second window portion 110. The optical axis O2 (c.f. FIG. 2) of the illumination optic 122 is essentially parallel to the drawing plane of FIG. 1. The optical axis O2 of the illumination optic and the movement direction M of the sample 102 enclose an angle of about 90°. The optical axis O1 of the illumination optic 122 and the optical axis O2 of the detection optic 114 intersect within the flow cell 104, i.e. the sample space 106, and enclose an angle of about 90°. The orientation of the optical axes O1, O2 will be described in more detail below with reference to FIG. 2. By means of the illumination optic 122 it is possible to illuminate the object plane 116 of the detection optic 114 with a light sheet that is generated by directing illumination light through the illumination optic 122 into the flow cell 104.

As can be seen in FIG. 1, the samples 102 moving along their movement direction M are moving through the object plane 116 of the detection optic 114. Thereby, it becomes possible to capture images of different parallel planes within the samples 102. In other words, the samples 102 are optically sectioned.

In the present embodiment the detection optic 114 is exemplary arranged below and the illumination optic 122 is arranged at a back side of the flow cell 104. However, their positions may as well be interchanged. It is also possible to design the two optics such, that each can be used as a detection optic 114 as well as an illumination optic 122.

FIG. 2 is a schematic view of the optical axes O1, O2 of the detection optic 114 and the illumination optic 122 and the movement direction M of the samples 102.

As can be seen in FIG. 2, the optical axis O1 of the detection optic 114 and the movement direction M enclose a first angle α and define a first plane 200. Since the detection optic 114 is arranged below the flow cell 104 or the sample carrier, the first plane 200 is parallel to the direction of gravity in this embodiment, i.e. vertical. The optical axis O1 of the illumination optic 122 and the movement direction M enclose a second angle β and define a second plane 202. The optical axis O1 of the detection optic 114 and the optical axis O2 of the illumination optic 122 enclose a third angle γ. The first and second planes 200, 202 also enclose the third angle γ. The intersection of the first and second planes 200, 202 is parallel to the movement direction M of the samples 102 in this embodiment.

Figure 3:
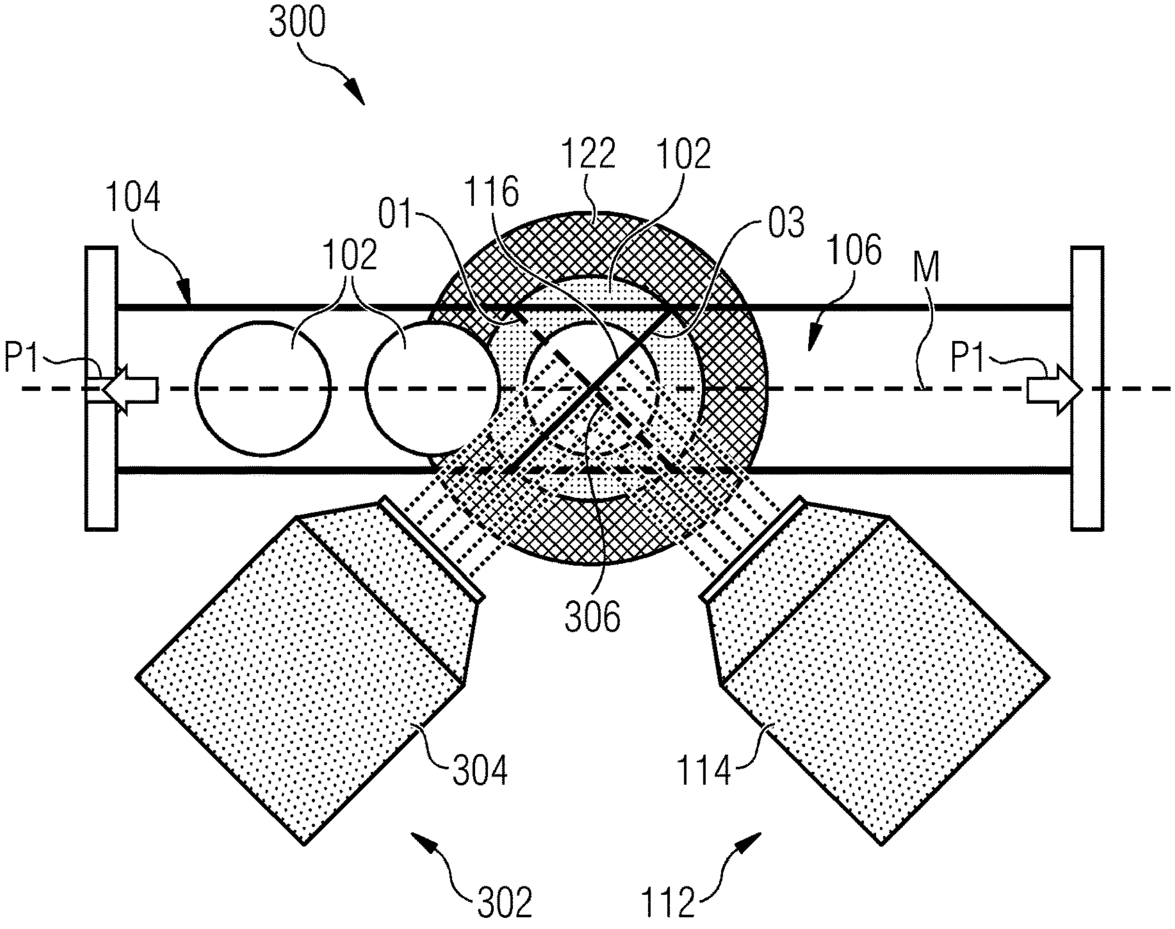
FIG. 3 is a schematic view of an imaging system according to another embodiment having two detection optics.

FIG. 3 is a schematic view of an imaging system 300 according to another embodiment.

The imaging system 300 according to FIG. 3 is distinguished from the imaging system 100 according to FIG. 1 in having a second optical detection system 302 that is arranged below the flow cell 104 to the left of the first optical detection system 112 in FIG. 3. The second optical detection system 302 comprises a second detection optic 304. The optical axes O1, O3 of the first and second detection optics 114, 304 are in the first plane 200, intersect within the sample space 106, and enclose an angle of about 90°. The second optical detection system 302 can in particular be used to improve the resolution of the imaging system 100, by combining images captured by the first and second optical detection systems 112, 302. This will be explained in more detail below with reference to FIG. 19.

Figure 4:
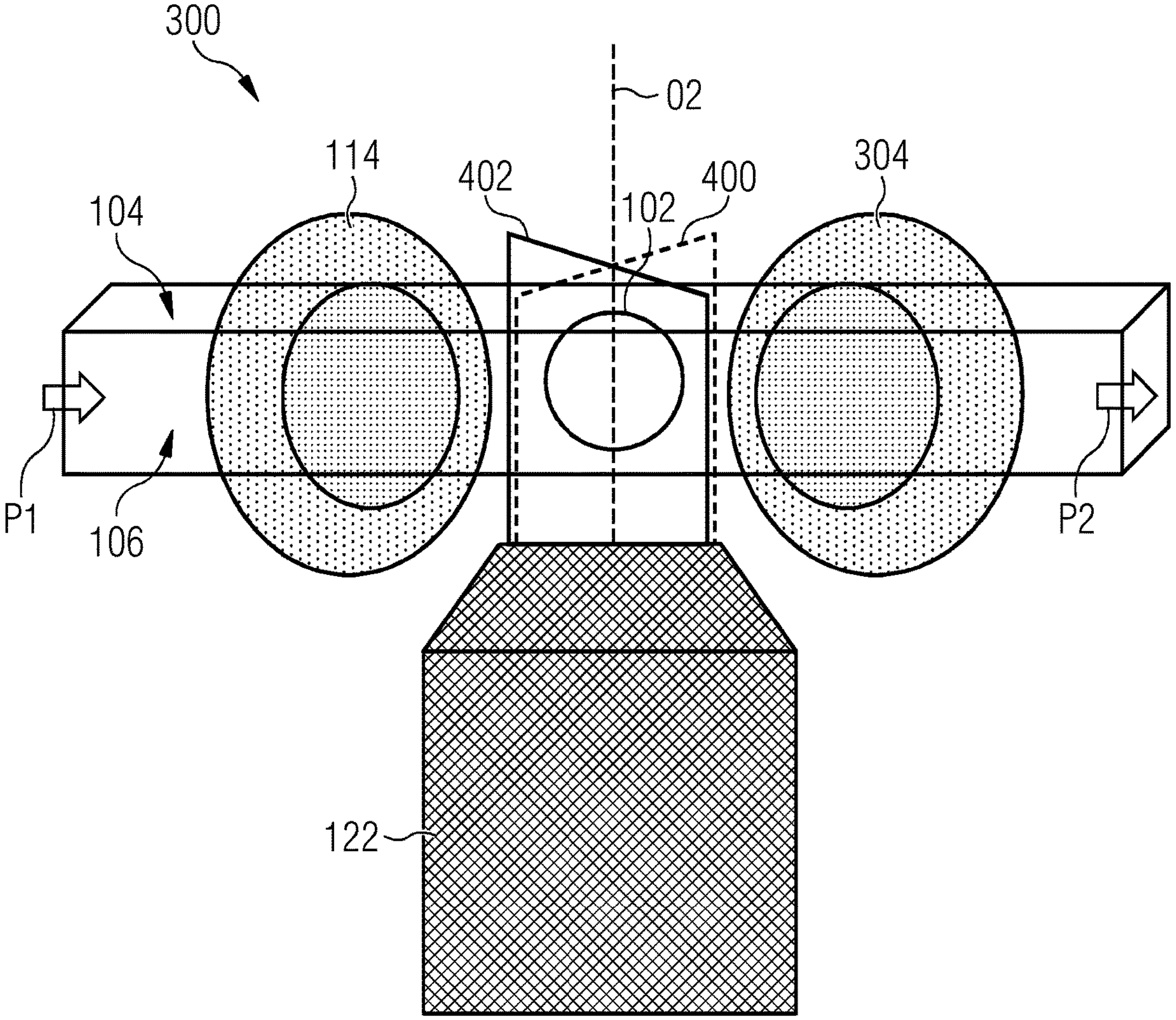
FIG. 4 is a schematic top view of the imaging system according to FIG. 3.

Further, the optical axes O1, O3, O3 of the first and second detection optics 114, 304 and of the illumination optic 122 intersect in one point in this embodiment. They might intersect in volume being defined by the field of view of the first and second detection optics 114, 304 and of the illumination optic 122. Thus, the object planes 116, 306 of the first and second detection optics 114, 304 can both be illuminated by the illumination optic 122, in particular with a light sheet 400, 402 (c.f. FIG. 4) that is generated by directing illumination light through the illumination optic 122 into the sample space 106. Preferably, the object planes 116, 306 of the first and second detection optics 114, 304 are illuminated in an alternating fashion. The alternating illumination is described in more detail below with reference to FIG. 4.

FIG. 4 is a schematic top view of the imaging system 300 according to FIG. 3.

Figure 5:
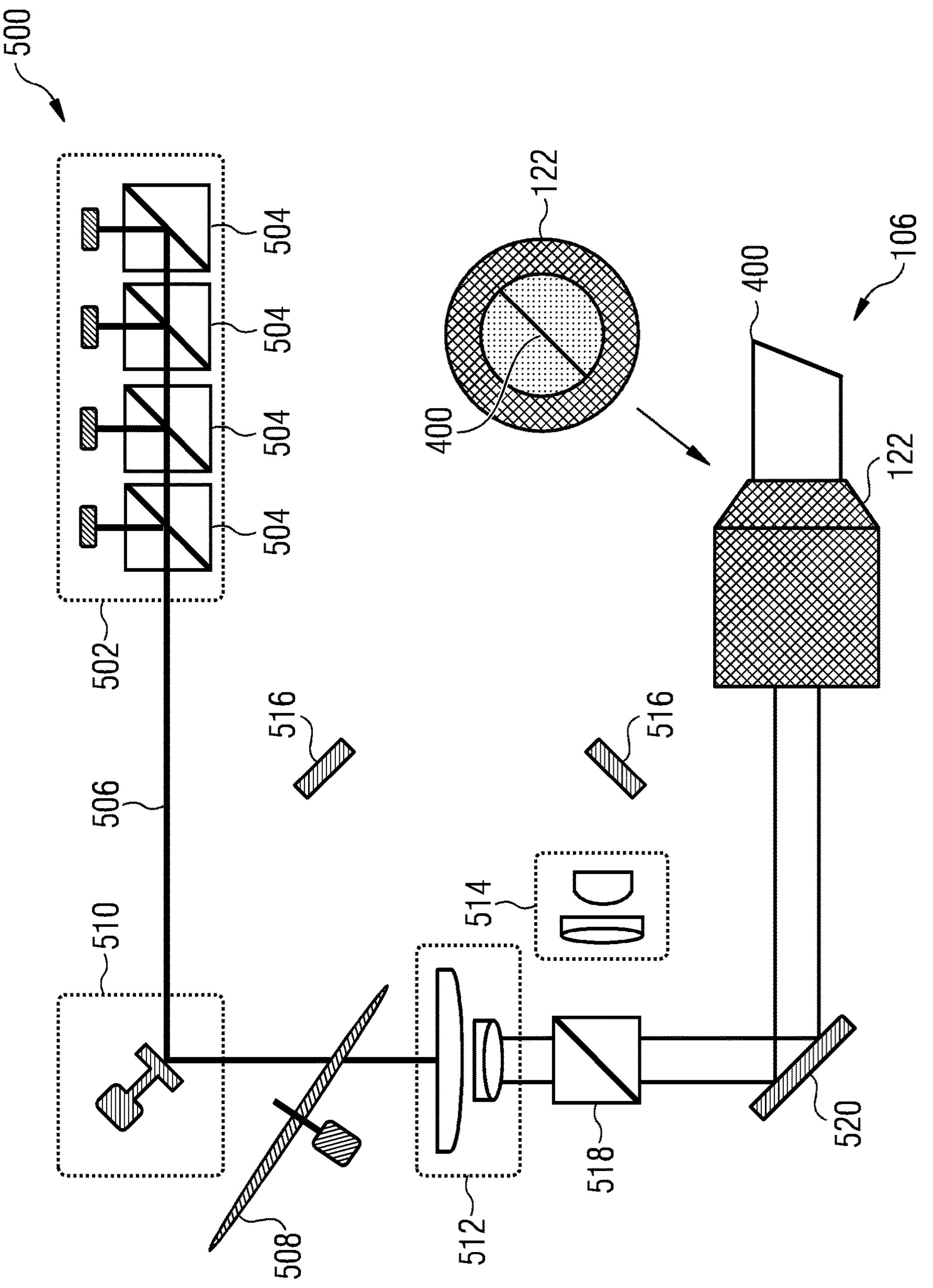
FIG. 5 is a schematic view of the light sheet illumination unit of the imaging system according to an embodiment.

A first light sheet 400 illuminates the object plane 116 of the first detection optic 114 and is shown in FIG. 3 by a dashed line. A second light sheet 402 illuminates the object plane 306 of the second detection optic 304 and is shown in FIG. 3 by a solid line. The second light sheet 402 is rotated by 90° around the optical axis O2 of the illumination optic 122 compared to the first light sheet 400. The first and second light sheets 400, 402 are generated in quick succession by means of a light sheet illumination unit 500 (c.f. FIG. 5). The light sheet illumination unit 500 is described below with reference to FIGS. 5 and 6.

FIG. 5 is a schematic view of the light sheet illumination unit 500 of the imaging system 100, 300 according to an embodiment.

Figure 7:
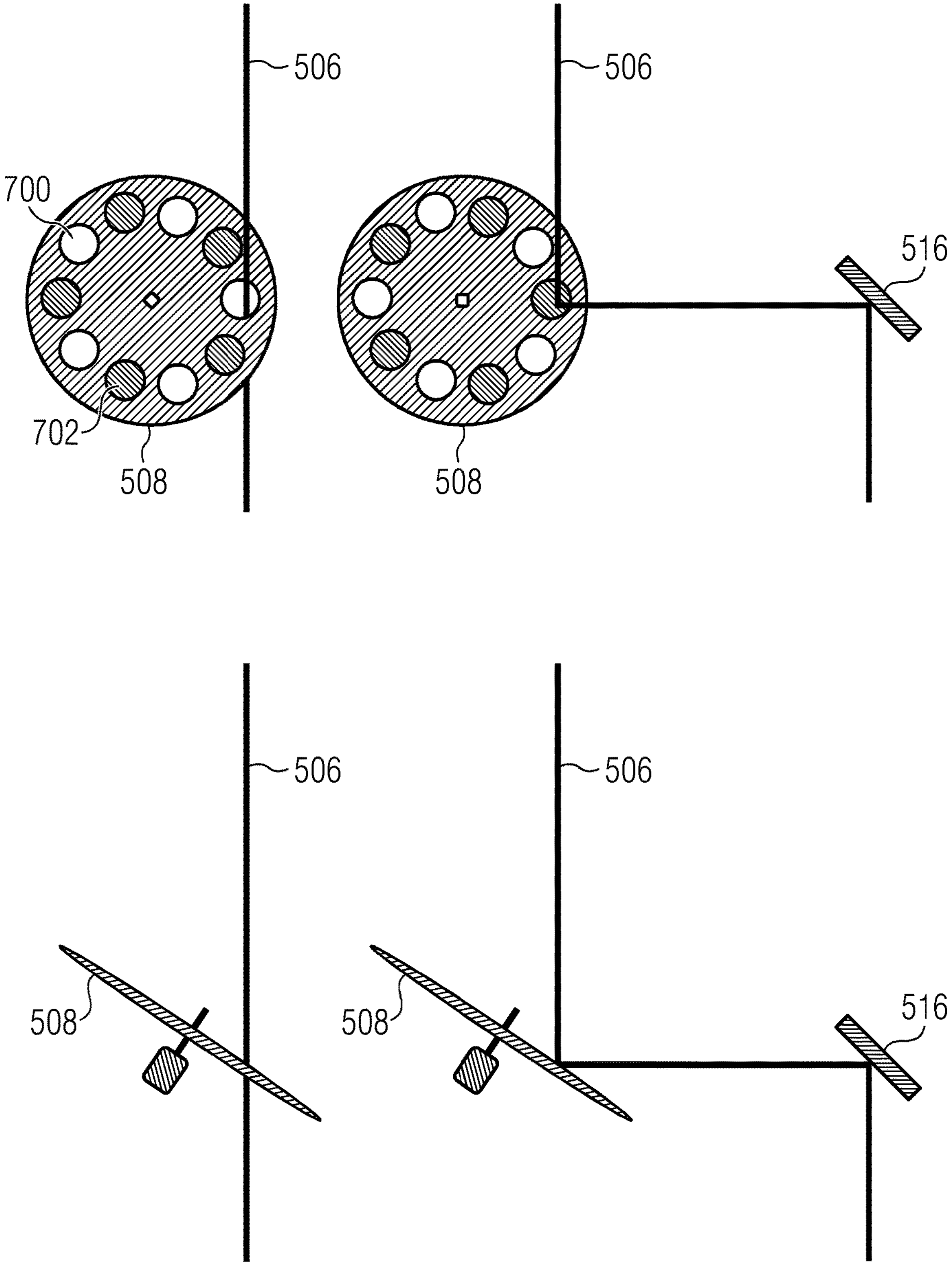
FIG. 7 comprises four schematic views of the chopper wheel of the light sheet illumination unit according to FIGS. 5 and 6.

The light sheet illumination unit 500 comprises a light source 502. The light source 502 exemplary comprises four beam splitters 504 that are arranged such that they combine illumination light from four light sources shown as four hatched rectangles into a single beam 506. Alternatively, the light source 502 may be a white light laser or any other—preferably coherent—light source 502. The single beam 506 is directed at a chopper wheel 508 via a stationary mirror or a scanning mirror 510. A scanning mirror or a light direction alternating unit, e.g. an AOD (acousto optical deflector), a digital mirror device, or tunable lens, may be used for Illuminating a sample 102 out of slightly different illumination directions, for instance +/−5 degrees relative to the optical axis, in order to destrip or to reduce stripe artefacts, which are a common problem in light sheet illumination, or to generate a scanned light sheet. The chopper wheel 508 comprises holes 700 and mirrors 702 arranged alternately (c.f. FIG. 7). When the beam 506 meets a hole 700 of the chopper wheel 508, the beam 506 is directed at a first light sheet forming unit 512 and is formed into the first light sheet 400. The first light sheet forming unit 512 is exemplary formed as a cylindrical lens. When the beam 506 meets a mirror 702 of the chopper wheel 508, the beam 506 is directed at a second light sheet forming unit 514 via two mirrors 516 and is formed into the second light sheet 402. The second light sheet forming unit 514 is exemplary formed as a cylindrical lens that is rotated by 90° compared to the cylindrical lens of the first light sheet forming unit 512. Thus, the second light sheet 402 is rotated by 90° around the optical axis O2 of the illumination optic 122 compared to the first light sheet 400. The first and second light sheets 400, 402 are directed into the illumination optic 122 by a beam splitter 518 and a mirror 520. The illumination optic 122 then directs the first and second light sheets 400, 402 into the sample space 106. The light sheet illumination unit 500 allows to quickly switch between an illumination with the first light sheet 400 and an illumination with the second light sheet 402.

Regarding the possibility mentioned above to simultaneously generate both, the first and second light sheets 400, 402, the chopper wheel 508 could be omitted and a beam splitter 518 could be arranged e.g. as a 50:50 beam splitter directing light to the first and second light sheet forming unit 512, 514.

In the illustration according to FIG. 5, the beam 506 hits a hole 700 of the chopper wheel 508. Thus, the beam 506 is directed onto the first light sheet forming unit 512 and forms the first light sheet 400 in the sample space 106.

Figure 6:
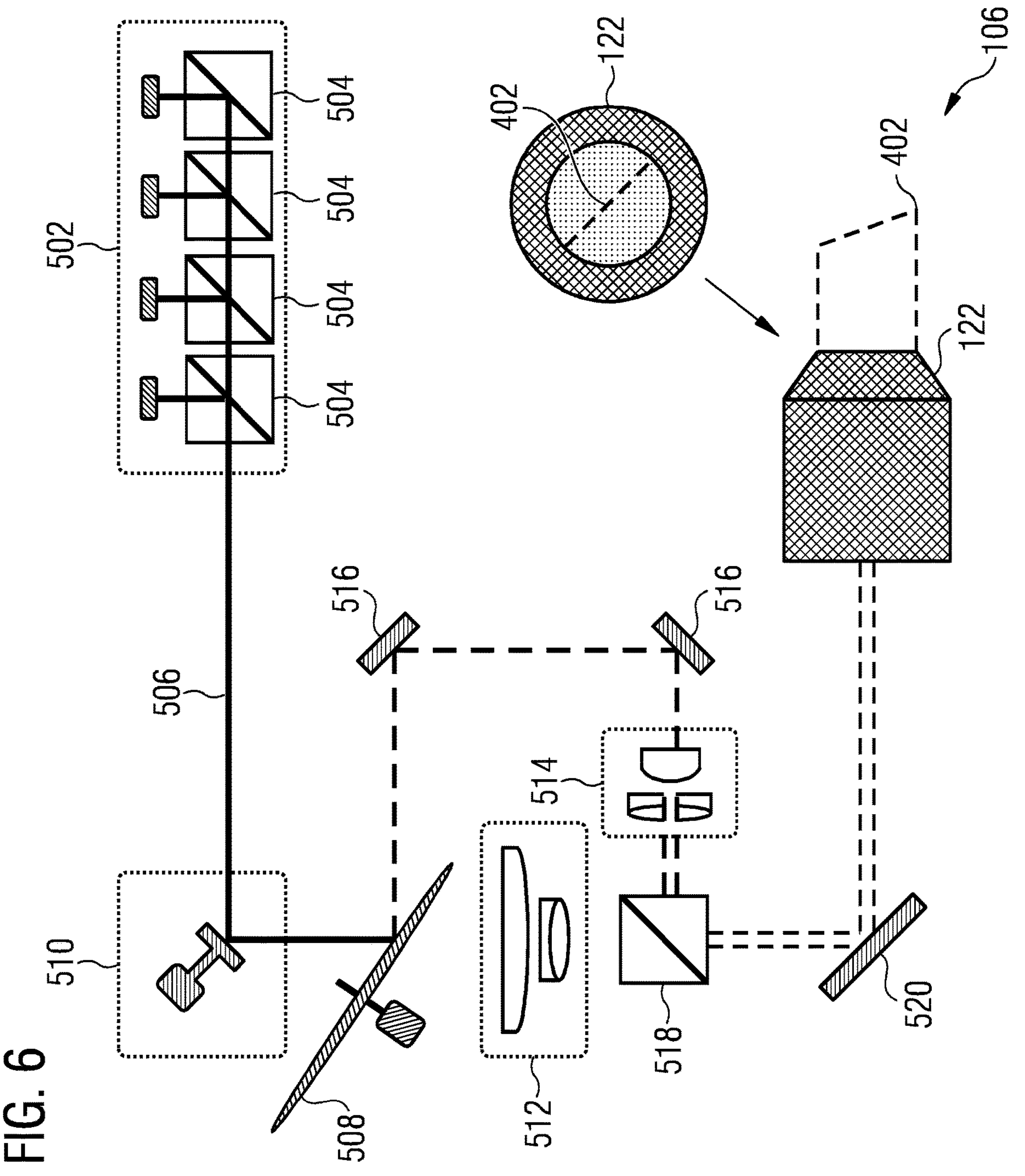
FIG. 6 is a schematic view of the light sheet illumination unit of the imaging system according to FIG. 5.

FIG. 6 is a schematic view of the light sheet illumination unit 500 of the imaging system 100, 300 according to FIG. 5.

In the illustration according to FIG. 6, the beam 506 hits a mirror 702 of the chopper wheel 508. Thus, the beam 506 is directed onto the second light sheet forming unit 514 via the two mirrors 516 and forms the second light sheet 402 in the sample space 106.

FIG. 7 comprises four schematic views of the chopper wheel 508 of the light sheet illumination unit 500 according to FIGS. 5 and 6.

The chopper wheel 508 comprises mirrors 702 and holes 700 that are arranged in alternating fashion circumferentially along the outer rim of the chopper wheel 508. The beam 506 is directed at the outer rim such that it alternatingly hits a mirror 702 and a hole 700 of the chopper wheel 508, when the chopper wheel 508 is rotating. When the incoming beam 506 hits a hole 700 of the chopper wheel 508, the beam 506 passes the chopper wheel 508 unhindered. This situation is depicted in a first view of the chopper wheel 508 in the top left of FIG. 7 and a second view in the bottom left of FIG. 7. The normal of each mirror 702 is oriented with respect to the incoming beam 506, e.g. by 45°. Thereby, the beam 506 is deflected away from its original direction. This situation is depicted in a third view of the chopper wheel 508 in the top right of FIG. 7 and a fourth view in the bottom right of FIG. 7.

Figure 8:
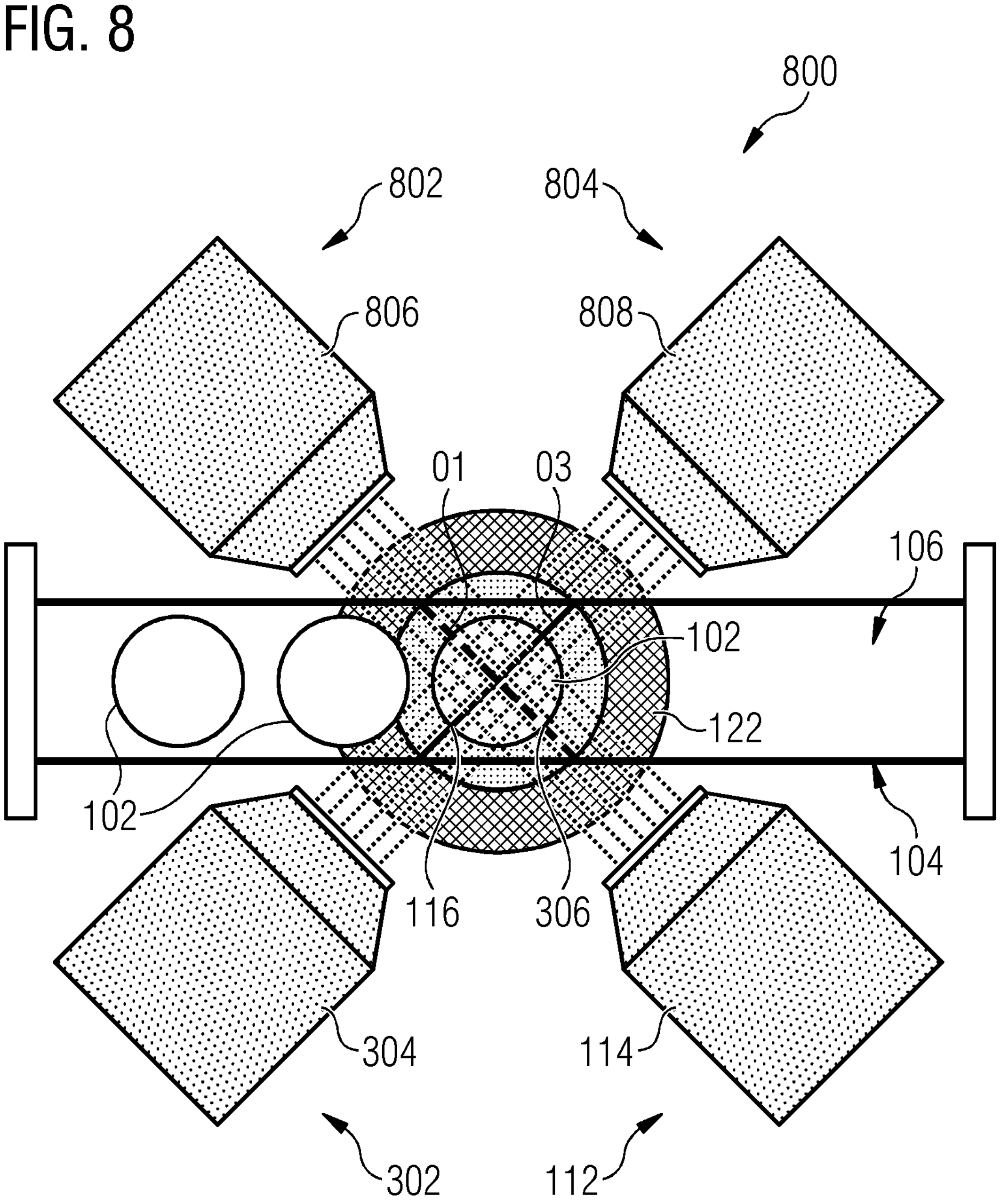
FIG. 8 is a schematic view of an imaging system according to another embodiment having four detection optics.

FIG. 8 is a schematic view of an imaging system 800 according to another embodiment.

The imaging system 800 according to FIG. 8 is distinguished from the imaging system 100 according to FIG. 3 in having third and fourth optical detection systems 802, 804 that are arranged above the flow cell 104. The third and fourth optical detection systems 802, 804 comprises third and fourth detection optics 806, 808, respectively. The third detection optic 806 is arranged opposite the first detection optic 114 such that their optical axes O1 are identical. Likewise, the fourth detection optic 808 is arranged opposite the second detection optic 304. In the present embodiment, the object planes 116 of the first and third detection optics 114, 806 as well as the object planes 306 of the second and fourth detection optics 304, 808 are identical or at least essentially parallel with the slide offset to each other. The optical axes O1, O2, O3 of all detection optics 114, 304, 806, 808 and of the illumination optic 122 intersect in one point in the sample space 106 or in a volume being defined by at least one of the field of views of the detection optics 114, 304, 806, 808 and of the illumination optic 122. Thus, the object planes 116, 306 of each of the four detection optics 114, 304, 806, 808 can both be illuminated by the illumination optic 122, in particular with a light sheet 400, 402. In particular, the object planes 116, 306 can be illuminated in the alternating fashion by the light sheet illumination unit 500 described above with reference to FIGS. 5 and 6. The embodiment shown in FIG. 8 can be used to generate 4 views using the same acquisition parameters (e.g. excitation lights, detection channels, exposure time, or gain for example), which can be regarded as 4 equivalent views from 4 different angles. Alternatively, some or all of the views may be acquired using different acquisition parameters like for example the first 2 views may be acquired with first a certain setting of excitation wavelengths and detection channels and the second 2 views may be acquired with a second setting of excitation wavelengths and detection channels. In this way the number of dyes that can be readout can be increased.

Figure 9:
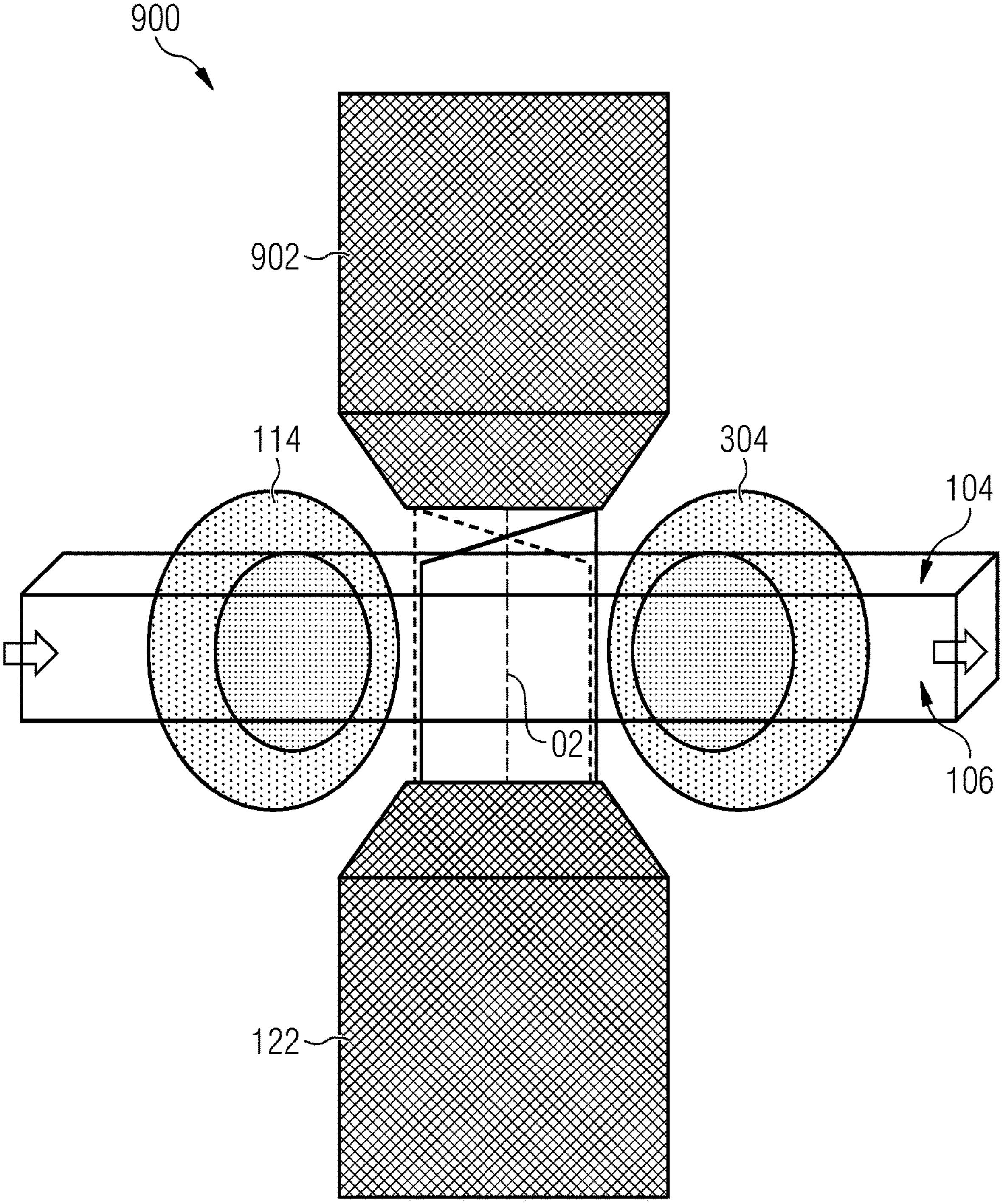
FIG. 9 is a schematic view of an imaging system according to another embodiment having two illumination optics.

FIG. 9 is a schematic view of an imaging system 900 according to another embodiment.

The imaging system 900 according to FIG. 9 is distinguished from the imaging system 300 according to FIG. 3 in having a second illumination optic 902. The second illumination optic 902 is arranged opposite the first illumination optic 122. The optical axes O2 of the first and second illumination optics 122, 902 are identical or at least essentially parallel with the slide offset to each other. The arrangement of the first and second illumination optics 122, 902 allows the sample 102 to be illuminated from opposite sides. Thereby, shadowing effects are reduced. In particular, the object planes 116, 306 of the first and second detection optics 114, 304 can be illuminated with light sheets from opposites side. A light sheet illumination unit 1000 for illuminating the object planes 116, 306 of the first and second detection optics 114, 304—and possibly of the third and fourth detection optics 806, 808—is described below with reference to FIGS. 10 to 17.

The flow cell 104 in FIG. 9, but also the other flow cells mentioned in this document and in particular in the other Figures, showing flow cells, have a rectangular or square cross section. Alternatively, they could comprise a circular or elliptical cross section where preferably the window portion has a surface curvature being relatively small.

Figure 10:
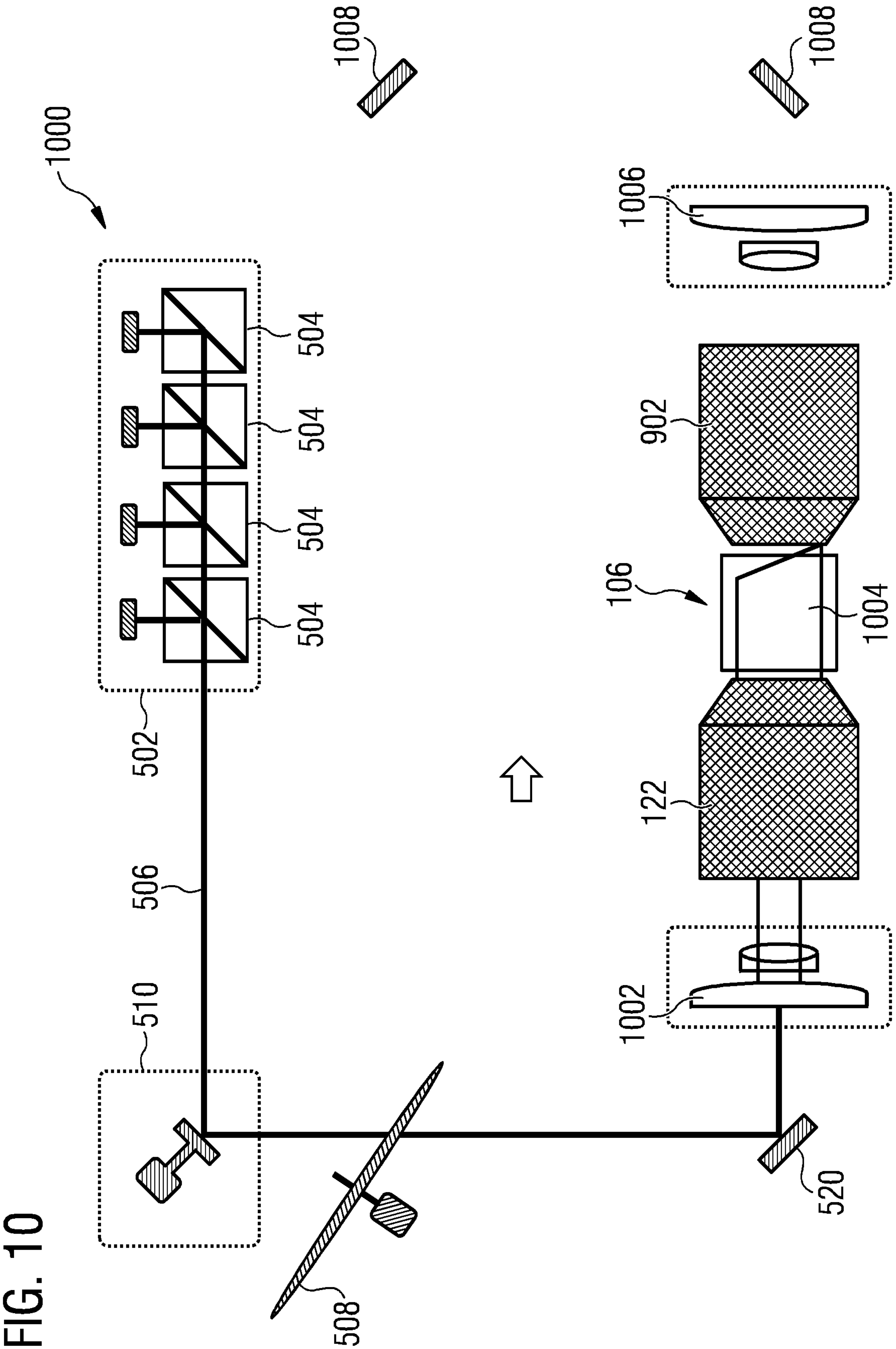
FIG. 10 is a schematic view of the light sheet illumination unit of the imaging system according to an embodiment.

FIG. 10 is a schematic view of the light sheet illumination unit 1000 of the imaging system 900 according to an embodiment.

Figure 11:
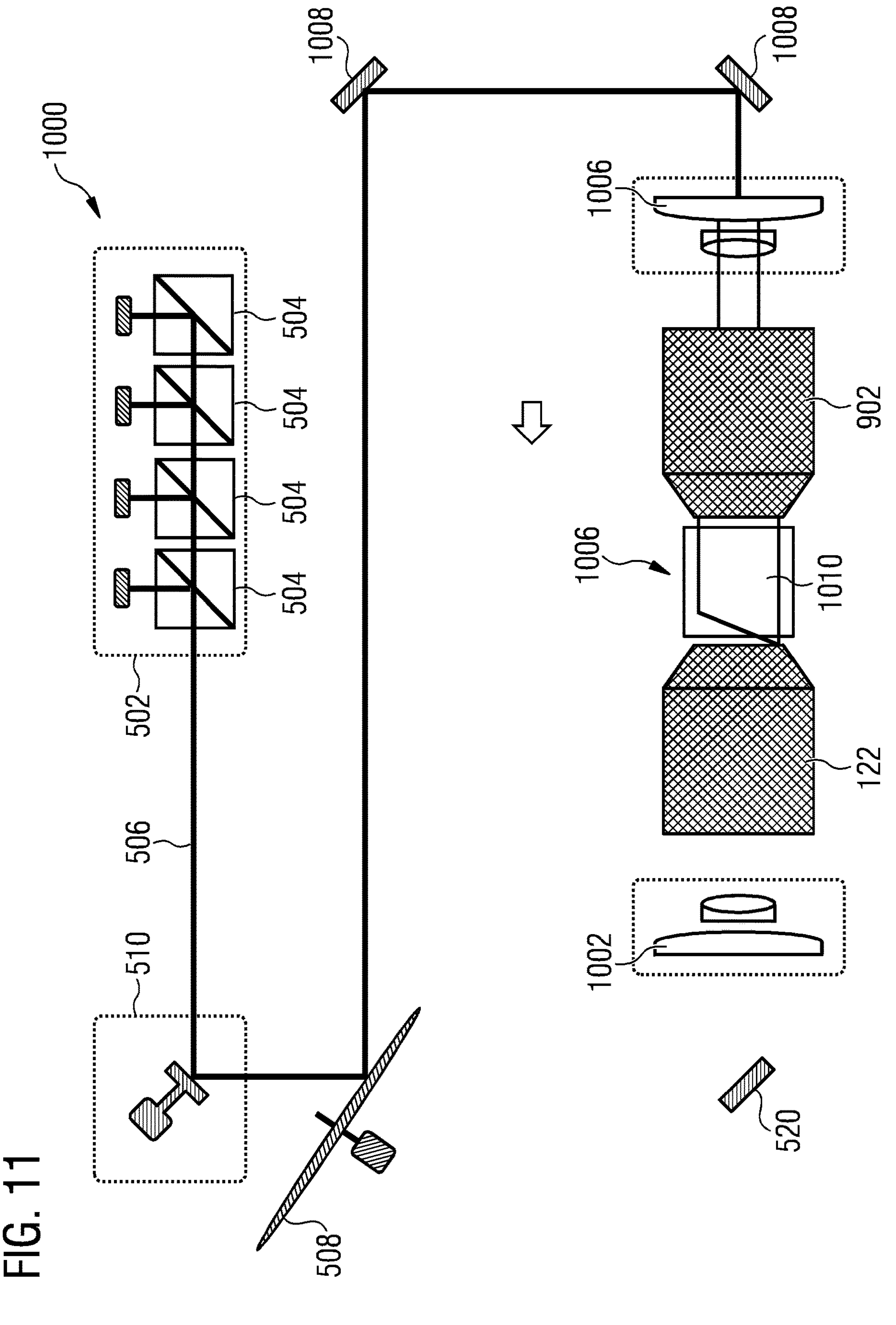
FIG. 11 is a schematic view of the light sheet illumination unit of the imaging system according to FIG. 10.

The single beam 506 generated by the light source 502 is directed at a chopper wheel 508 via a scanning mirror 510 or a stationary mirror 702. The chopper wheel 508 comprises holes 700 and mirrors 702 arranged alternately (c.f. FIG. 7). When the beam 506 meets a hole 700 of the chopper wheel 508, the beam 506 is directed at a first light sheet forming unit 1002 that that is arranged between the mirror 520 and at the image side of the first illumination optic 122. The first light sheet forming unit 1002 forms the beam 506 into a light sheet 1004 that is then directed via the first illumination optic 122 into the sample space 106. When the beam 506 meets a mirror 702 of the chopper wheel 508, the beam 506 is directed at a second light sheet forming unit 1006 via two mirrors 1008. The second light sheet forming unit 1006 is arranged between the mirror 1008 and the second illumination optic 902 and forms the beam 506 into another light sheet 1010 (c.f. FIG. 11). This light sheet 1010 is then directed via the second illumination optic 902 into the sample space 106. The light sheet illumination unit 500 according to FIG. 10 allows to quickly switch between an illumination via the first illumination optic 122 and an illumination via the second illumination optic 902.

In the illustration according to FIG. 10, the beam 506 hits a hole 700 of the chopper wheel 508. The beam 506 is directed onto the first light sheet forming unit 1002 and the light sheet is directed into the sample space 106 via the first illumination optic 122.

FIG. 11 is a schematic view of the light sheet illumination unit 1000 of the imaging system 900 according to FIG. 10.

In the illustration according to FIG. 11, the beam 506 hits a mirror 702 of the chopper wheel 508. Thus, the beam 506 is directed onto the second light sheet forming unit 1006 via the two mirrors 1008. The light sheet 1010 is directed into the sample space 106 via the second illumination optic 902.

Figure 12:
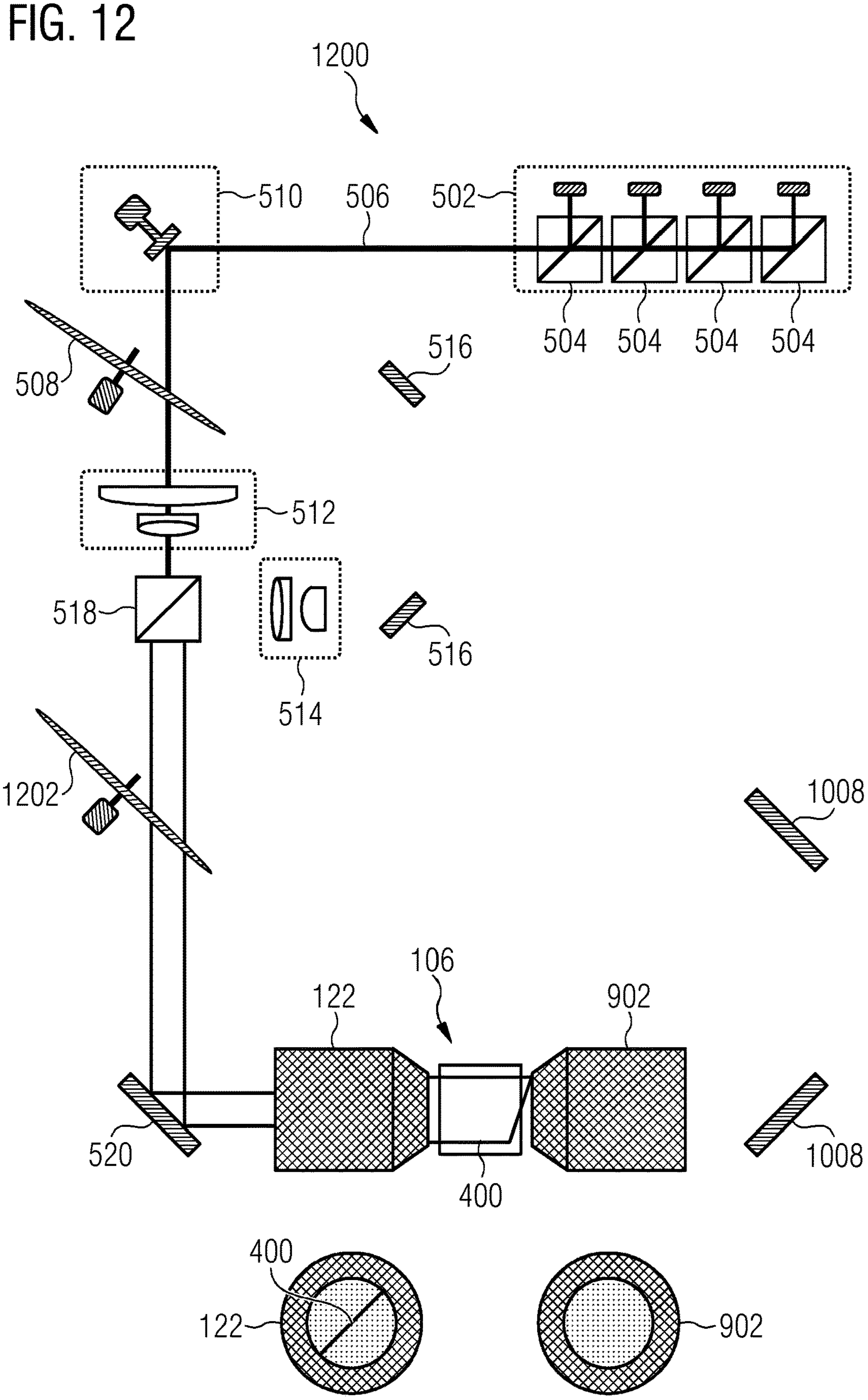
FIG. 12 is a schematic view of the light sheet illumination unit of the imaging system according to another embodiment.

FIG. 12 is a schematic view of the light sheet illumination unit 1200 of the imaging system 900 according to another embodiment.

The light sheet illumination unit 1200 according to FIG. 12 is distinguished from the light sheet illumination unit 500 according to FIG. 5 in having a second chopper wheel 1202. The second chopper wheel 1202 is arranged between the beam splitter 518 and the mirror 520 and is used to generate the first and second light sheets 400, 402 to illuminate the sample by the first and second illumination optic 122, 902. Like the first chopper wheel 508, the second chopper wheel 1202 comprises holes 700 and mirrors 702 (c.f. FIG. 7) that are arranged alternatingly around the out rim of the second chopper wheel 1202. When one of the two illumination light beams hits a hole 700 of the second chopper wheel 1202, the illumination light beam is direct via mirror 520 and the first illumination optic 122 into the sample space 106. When the two light sheets 400, 402 hits a mirror 702 of the second chopper wheel 1202, the illumination light beam is directed via the two mirrors 1008 through the second illumination optic 902 and into the sample space 106. The light sheet illumination unit 1200 according to FIG. 12 allows to quickly switch between an illumination via the first illumination optic 122 and an illumination via the second illumination optic 902 as well as an illumination with the first light sheet 400 and an illumination with the second light sheet 402. In other word, the light sheet illumination unit 1200 according to FIG. 12 allows for a quick change of the illumination direction as well as a quick change of the orientation of the light sheet 400, 402 in the sample space 106.

In the illustration according to FIG. 12, the beam 506 hits a hole 700 of the first chopper wheel 508. Thus, the beam 506 is directed onto the first light sheet forming unit 512 being used for forming the first light sheet 400. The illumination light beam then hits a hole 700 of the second chopper wheel 1202 and is directed into the sample space 106 via the first illumination optic 122.

The schematic view of the light sheet illumination unit 1200 as shown in FIG. 12 is only a schematic representation and further optical elements, e.g. at least one relay optic, might be arranged between the first and/or second light sheet forming unit 512, 514. The same might apply to the beam paths shown in the FIGS. 13 to 17.

Figure 13:
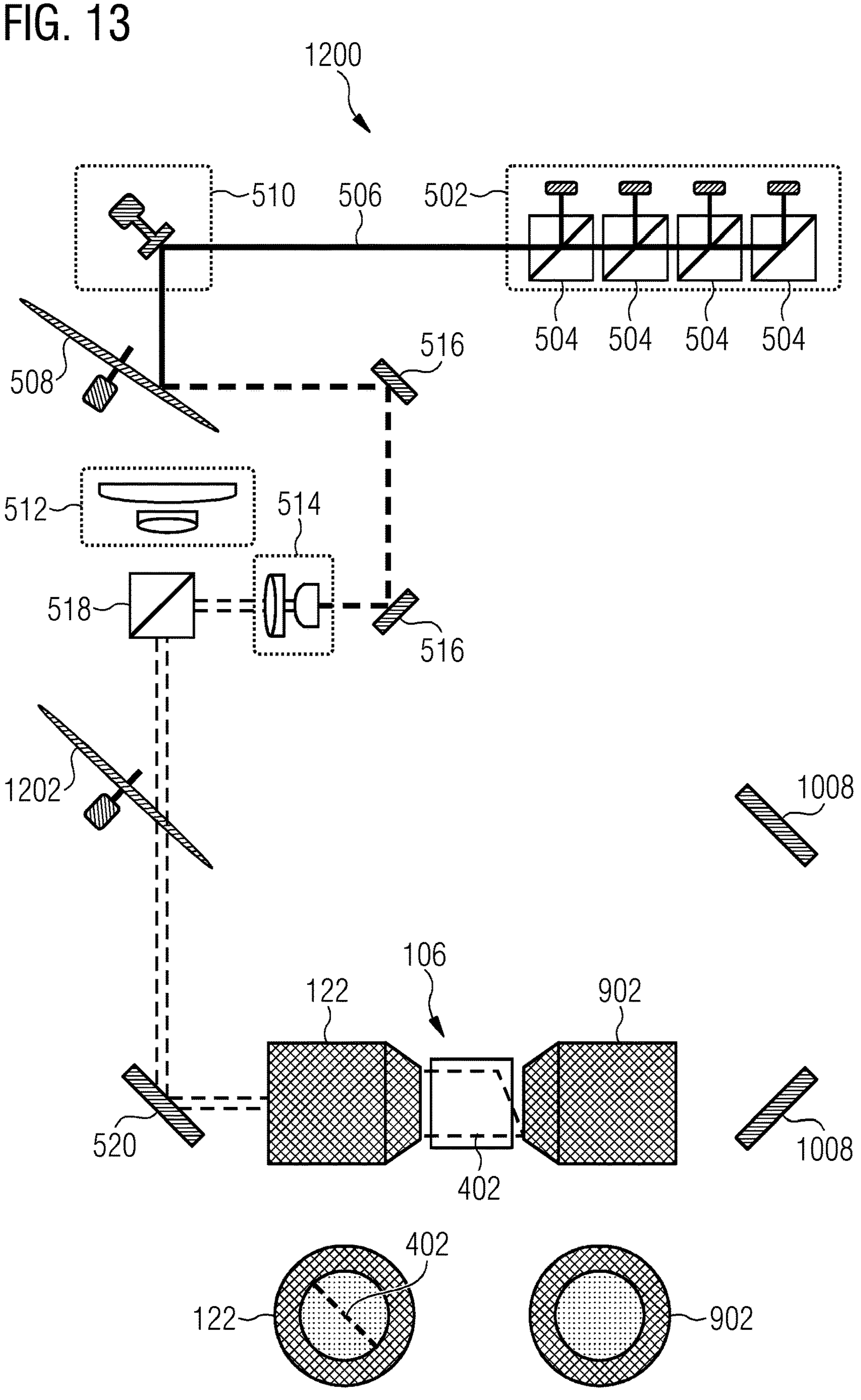
FIG. 13 is a schematic view of the light sheet illumination unit of the imaging system according to FIG. 12.

FIG. 13 is a schematic view of the light sheet illumination unit 1200 of the imaging system 900 according to FIG. 12.

In the illustration according to FIG. 13, the beam 506 hits a mirror 702 of the first chopper wheel 508 and is directed onto the second light sheet forming unit 514 via the mirrors 516. When the illumination light beam then hits a hole 700 of the second chopper wheel 1202, itis directed into the sample space 106 via the first illumination optic 122 in order to form the second light sheet 402.

Figure 14:
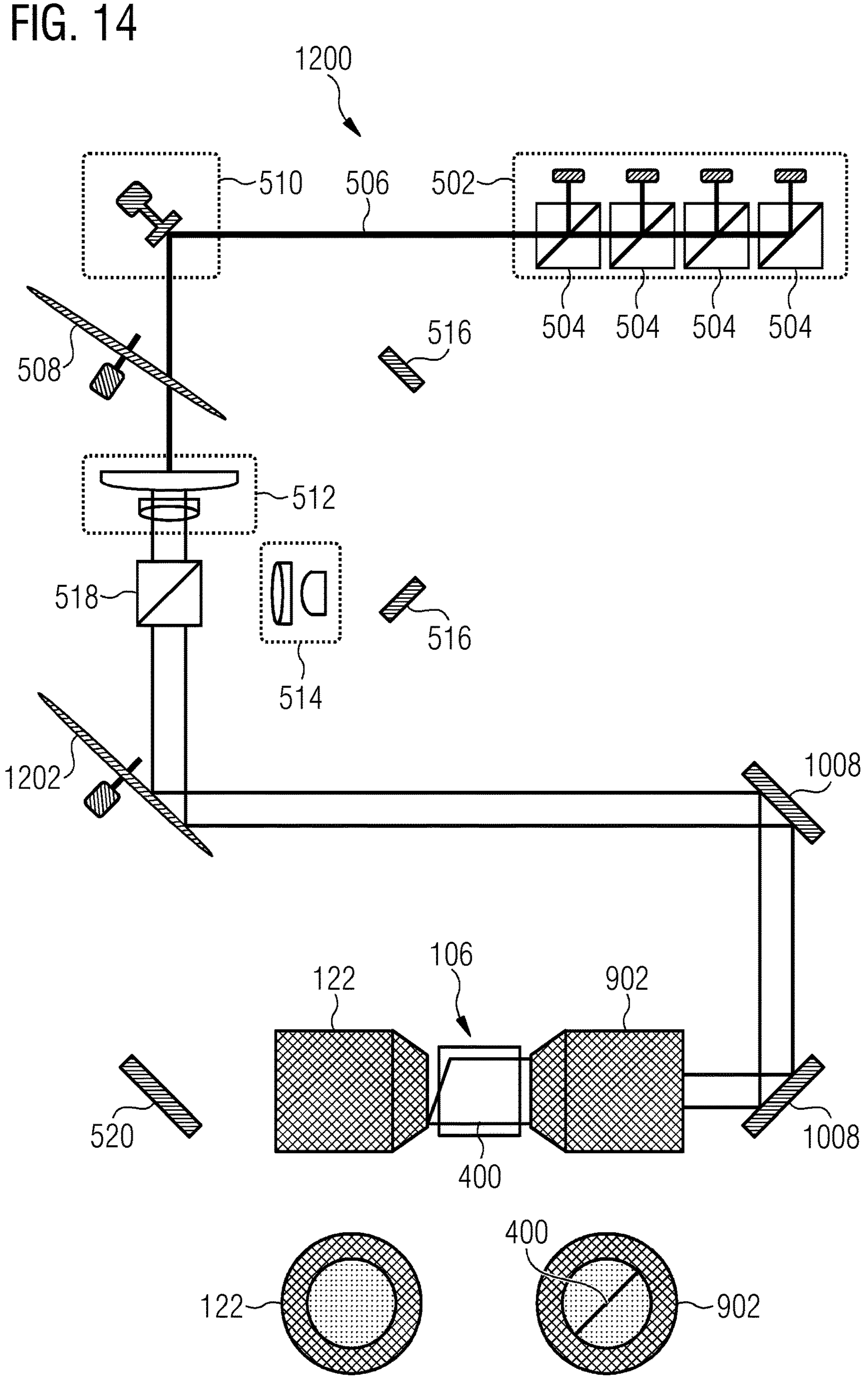
FIG. 14 is a schematic view of the light sheet illumination unit of the imaging system according to FIG. 12.

FIG. 14 is a schematic view of the light sheet illumination unit 1200 of the imaging system 900 according to FIG. 12.

In the illustration according to FIG. 14, the beam 506 hits a hole 700 of the first chopper wheel 508. The beam 506 passes the first chopper wheel 508 unhindered and propagates to the first light sheet forming unit 512. When the illumination light beam hits a mirror 702 of the second chopper wheel 1202, it is directed via the two mirrors 1008 into the sample space 106 via the second illumination optic 902 in order to form the first light sheet 400.

Figure 15:
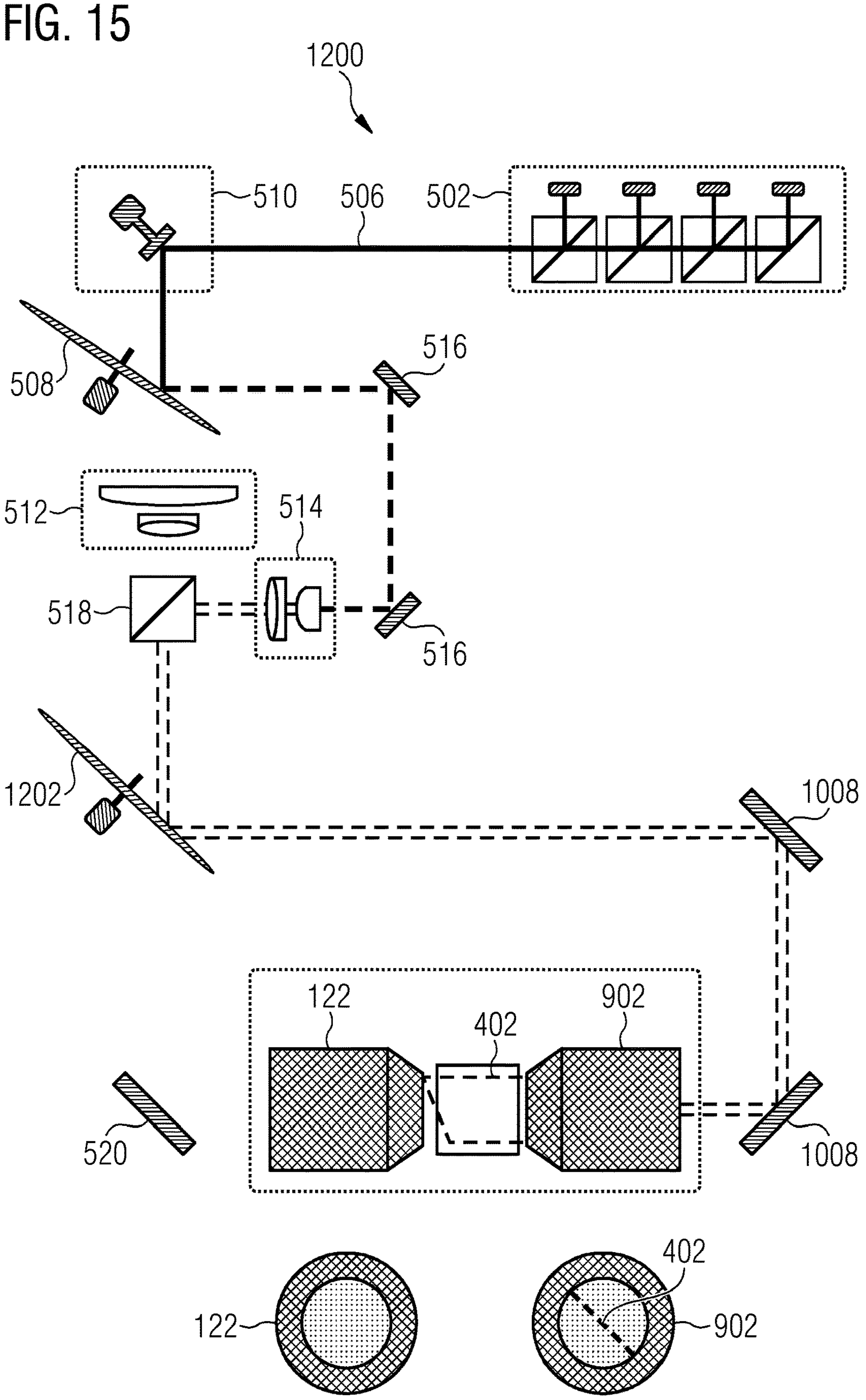
FIG. 15 is a schematic view of the light sheet illumination unit of the imaging system according to FIG. 12.

FIG. 15 is a schematic view of the light sheet illumination unit 1200 of the imaging system 900 according to FIG. 12.

In the illustration according to FIG. 15, the beam 506 hits a mirror 702 of the first chopper wheel 508 and is deflected via the two mirrors 516 to the second light sheet forming unit 514. When the illumination light beam hits a mirror 702 of the second chopper wheel 1202, it is directed into the sample space 106 via the second illumination optic 902 in order to form the second light sheet 402.

Figure 16:
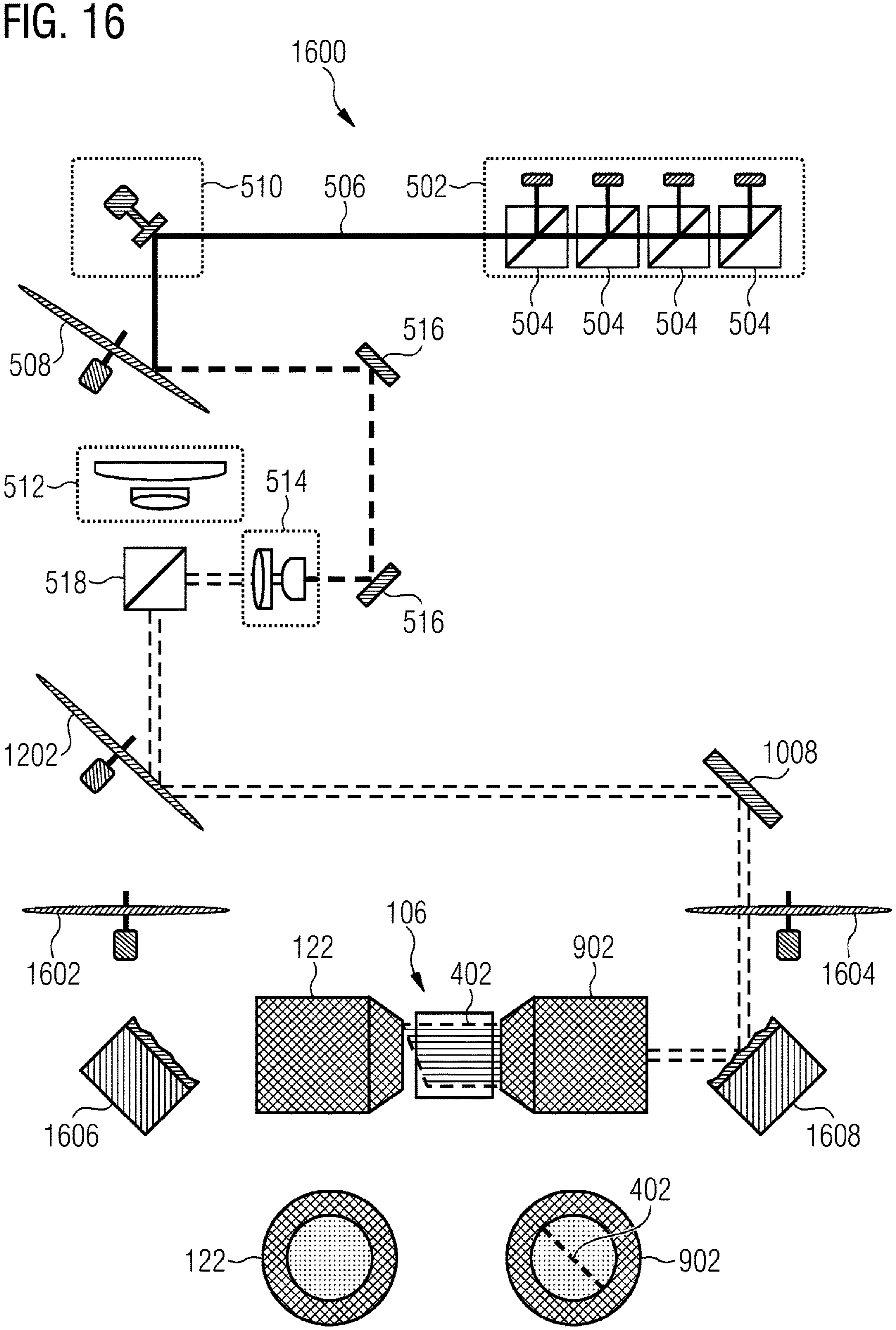
FIG. 16 is a schematic view of the light sheet illumination unit of the imaging system according to another embodiment.

FIG. 16 is a schematic view of the light sheet illumination unit 1600 of the imaging system 900 according to another embodiment.

The light sheet illumination unit 1600 according to FIG. 16 is distinguished from the light sheet illumination unit 1200 according to FIG. 12 in being configured to wobble the first and second light sheets 400, 402. The wobbling, i.e. a slight displacement of the light sheets perpendicular to their direction of propagation and/or parallel to the illumination plane, is achieved by means of third and fourth chopper wheels 1602, 1604. The third and fourth chopper wheels 1602, 1604 comprise glass plates arranged on the outer rim of the third and fourth chopper wheels 1602, 1604, respectively. The glass plates are configured such that they deflect passing light beams slightly in an alternating fashion. The third chopper wheel 1602 is arranged between the second chopper wheel 1202 and the first illumination optic 122. The fourth chopper wheel 1604 is arranged between the second chopper wheel 1202 and the second illumination optic 902. The wobbling of the first and second light sheets 400, 402 reduces stripe artefacts, which are a common problem in light sheet fluorescence microscopy.

The light sheet illumination unit 1600 according to FIG. 16 exemplary comprises two spatial light modulating elements 1606, 1608, which might be e.g. spatial light modulators and/or digital mirror devices. A first spatial light modulating element 1606 is arranged between the third chopper wheel 1602 and the first illumination optic 122. A second spatial light modulating element 1608 is arranged between the fourth chopper wheel 1604 and the second illumination optic 902. The first and second light modulating elements 1606, 1608 can be used to pattern the first and/or second light sheets 400, 402, which may be used for structure illumination microscopy to improve resolution, photoactivation, and/or photolithography.

Figure 17:
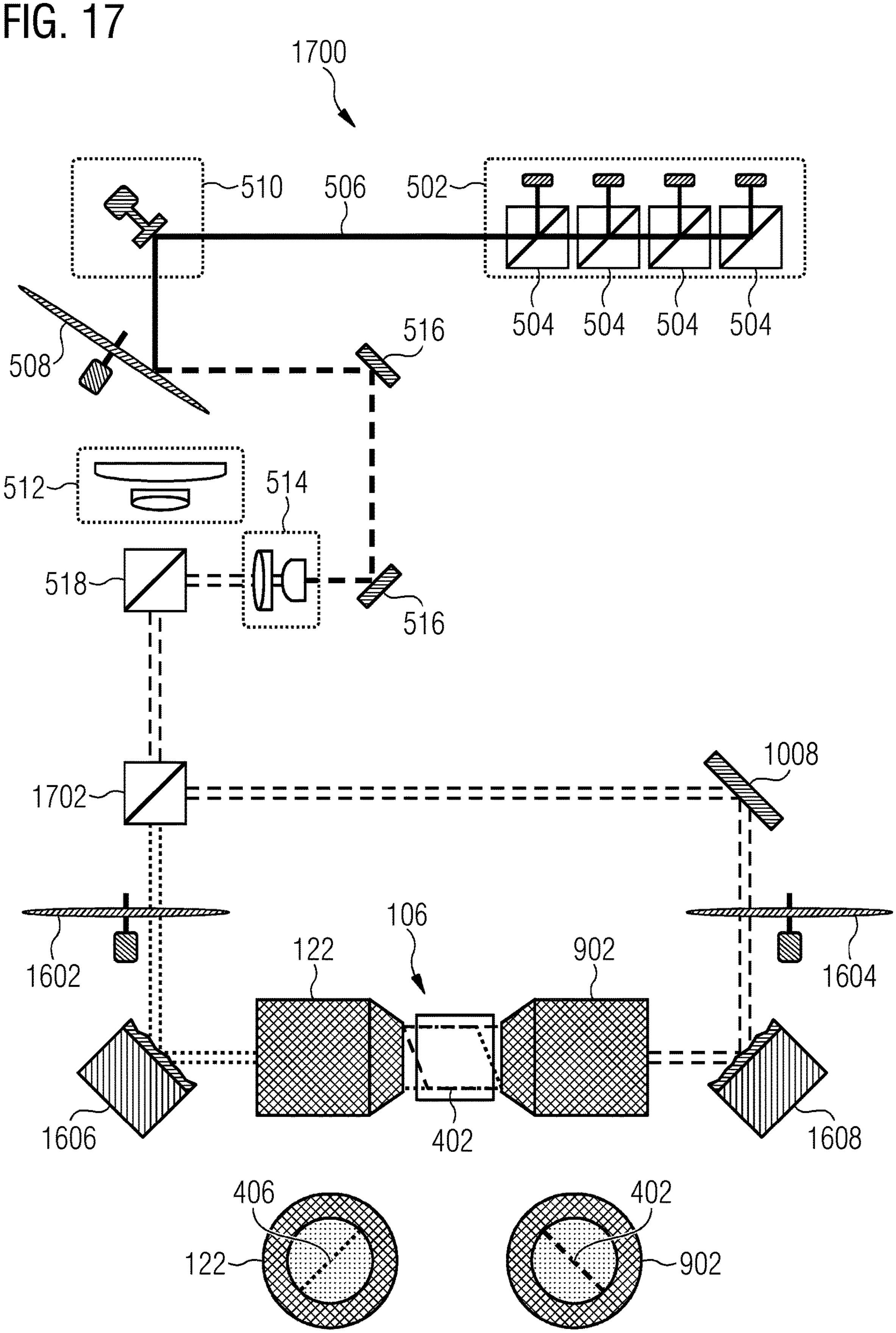
FIG. 17 is a schematic view of the light sheet illumination unit of the imaging system according to another embodiment.

FIG. 17 is a schematic view of the light sheet illumination unit 1700 of the imaging system 900 according to another embodiment.

The light sheet illumination unit 1700 according to FIG. 17 is distinguished from the light sheet illumination unit 1600 according to FIG. 16 in that the second chopper wheel 1202 is replaced with a second beam splitter 1702. The second beam splitter 518 directs incoming light equally into the first and second illumination optics 122, 902. Thus, the first or second light sheet 402 is directed in equal parts into the first detection optic 114 and the second detection optic 304. In other words, in present embodiment, the sample space 106 is illuminated from two opposing sides at the same time.

Figure 18:
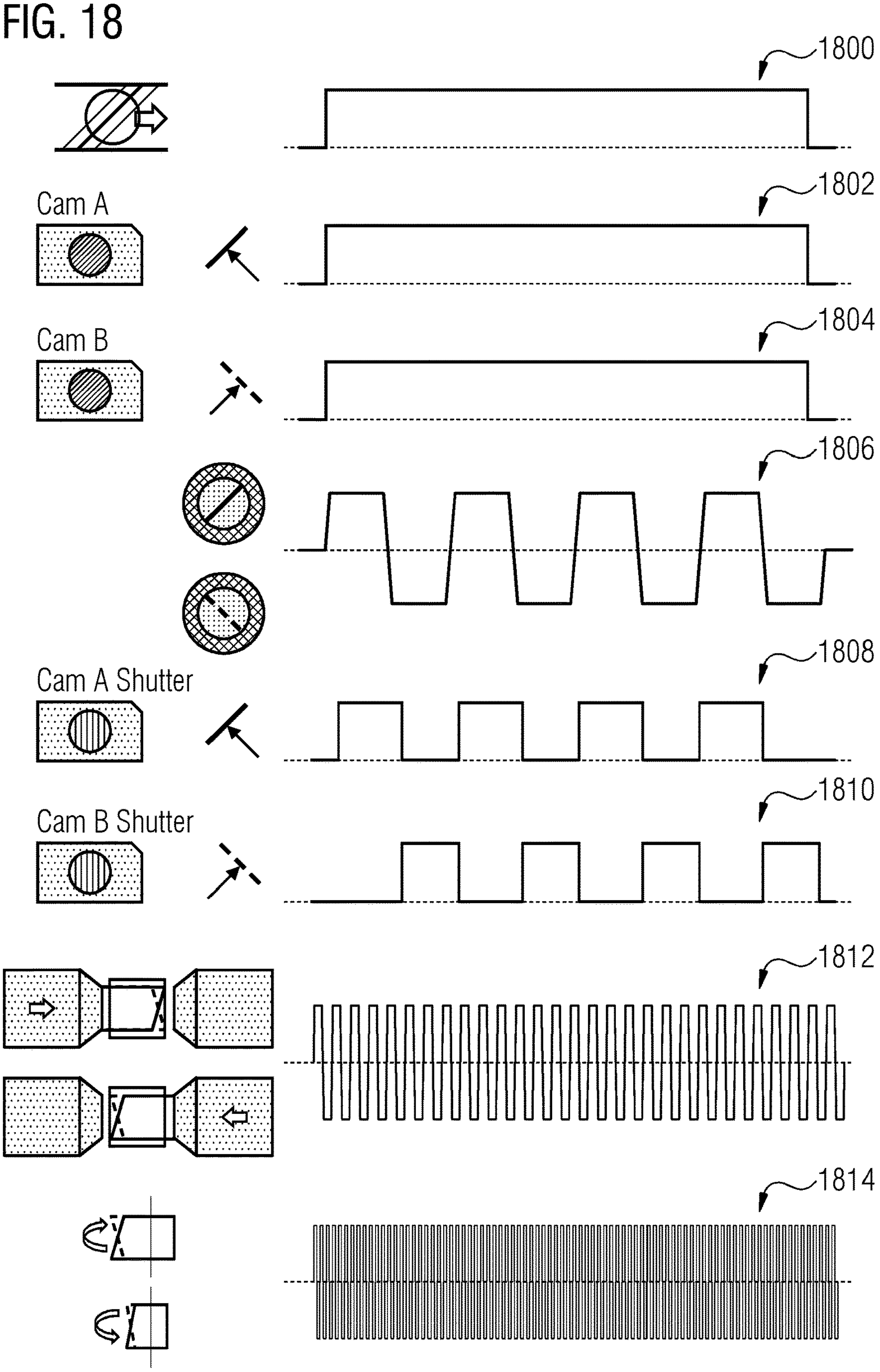
FIG. 18 is a diagram showing an exemplary synchronization scheme of the illumination unit and two optical detection systems of an imaging system according to an embodiment.

FIG. 18 is a diagram showing an exemplary synchronization scheme of the light sheet illumination unit 1000, 1200, 1600, 1700 and the two optical detection systems 112, 302 of an imaging system 900 according to an embodiment.

The diagram comprises 8 graphs 1800 to 1814. The abscissa of each graph 1800 to 1814 denotes time. A first graph 1800 shows whether a sample 102 is passing the object planes 116, 306 of the first and/or second detection optics 114, 304. This could be e.g. determined by a light gate sensor unit which might be a simple device being arranged upstream of an optical detection system with regard to the movement direction M. The graph 1800 has the value 1 when a sample 102 is passing the object planes 116, 306 and 0 when no sample 102 is passing the object plane 116, 306.

A second and third graph 1802, 1804 show the exposure time of the first and second optical detection systems 112, 302, respectively. When the graphs 1802, 1804 have the value 0, no image is captured. When the graphs 1802, 1804 has the value 1, an image is or a plurality of images are captured by the first and/or second optical detection systems 112, 302, respectively. As can be seen by comparing the first, second and third graphs 1800 to 1804, the exposure is synchronized with the detection of a sample 102. In other words, when a sample 102 is passing the object planes 116, 306 of the first and/or second detection optics 114, 304, an image is or a plurality of images are captured by the first and second optical detection systems 112, 302. However, the exposure time may also be set much shorter. In particular, the exposure time is set such that only a certain fraction of the depth of field of the first and second detection optics 114, 304 is traversed within the exposure time. Thus, no motion blur is visible in the resulting image.

A fourth graph 1806 shows whether the first or second light sheet 402 is guided into the sample space 106. When the graph 1806 has the value 0, no illumination takes place. When the graph 1806 has the value 1, the first light sheet 400 is guided into the sample space 106, i.e. the object plane 116 of the first detection optic 114 is illuminated. When the graph 1806 has the value −1, the second light sheet 402 is guided into the sample space 106, i.e. the object plane 306 of the second detection optic 304 is illuminated. As can be seen in FIG. 18, during the exposure time of the first and second optical detection systems 112, 302, the illumination is switched multiple times.

A fifth and sixth graph 1808, 1810 show a shutter position of the first and second optical detection systems 112, 302, respectively. A shutter could be implemented in the form of a physical shutter, e.g. a chopper wheel having at least one opening, or by a “virtual shutter”, i.e. an electronic shutter of the camera of the detector element 120. When the graphs 1808, 1810 have the value 0, the shutters are closed and no light enters or no image is acquired by the first or second optical detection system 112, 302. When the graphs 1808, 1810 have the value 1, the shutters are open and detection light may enter the first or second optical detection system 112, 302. As can be seen in FIG. 18, the shutter positions and the illumination are synchronized. This is not strictly required but may yield better results, in particular with samples 102 that have more out-of-focus blur, for example bigger three-dimensional samples 102 and/or samples 102 with more autofluorescence or more densely labeled samples 102. Depending on the particulars of the control of the detector element 120 of the first or second optical detection system 112, 302, the second and third graph 1802, 1804 regarding the exposure time of the first and second optical detection systems 112, 302 and the components related thereto might not be necessary.

A seventh graph 1812 shows whether the first or second illumination optic 902 is used to is generate the two light sheets 400, 402 into the sample space 106. When the graph 1802 has the value 0, no illumination takes place. When the graph 1812 has the value 1, the two light sheets are guided through the first illumination optic 122 into the sample space 106. When the graph 1812 has the value −1, the two light sheets are guided through the second illumination optic 902 into the sample space 106. While the first or second light sheet 400, 402 are generated, the illumination side is switched multiple times between opposite sides. This is optional, since a particular imaging unit may not have a second illumination optic 902, or a dual-side illumination may not be desirable in a given experimental situation. Even in imaging units comprising a second illumination optic 902 the dual side illumination may therefore be switched to a single side illumination by stopping the second chopper wheel 1202 at the appropriate position.

An eighth graph 1814 shows whether the first or second orientation of the light sheet is used being generated by chopper wheels 1602, 1604 and the spatial light modulators 1606 and 1608. As evident from a comparison of graphs 1812 and 1814 the orientation may be changed multiple times within the time, that is used to illuminate the sample from one side.

Alternatively, the switching of illumination sides may be faster than the switching of the illumination orientation. This may be controlled by the user to adapt to the specific needs of the respective application.

From the synchronization signals shown in FIG. 18, the relative speed for example of the chopper wheels 508, 1202 can be derived, i.e. the shown configuration depicts a particular example of the light sheet illumination units 1000, 1200, 1600 or 1700.

Figure 19:
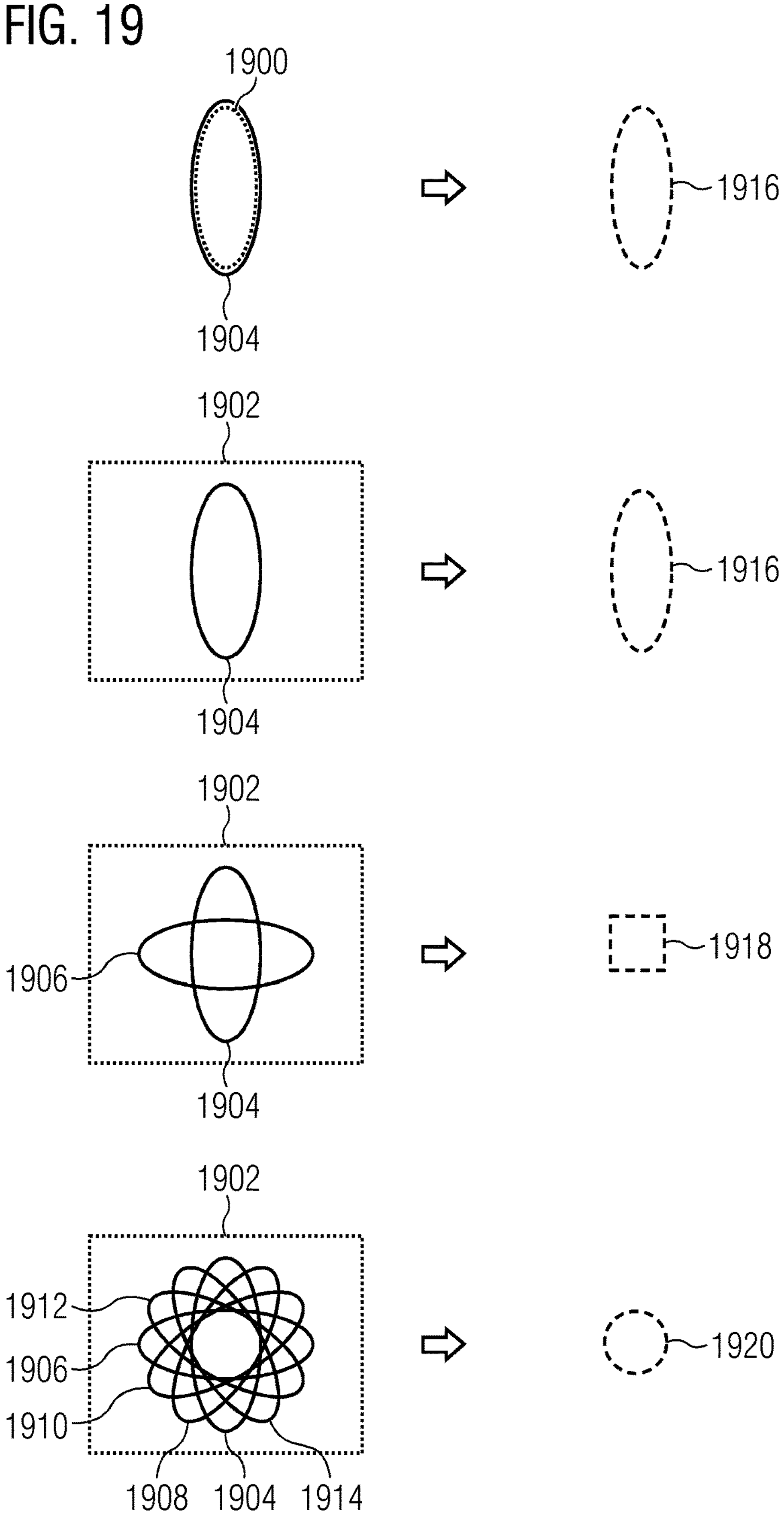
FIG. 19 is a schematic view of different point spread functions.

FIG. 19 is a schematic view of different point spread functions.

A first column, in FIG. 19 to the left, schematically depicts illumination point spread functions 1900, 1902 with dotted lines and detection point spread functions 1904 to 1914 as solid lines. A second column, in FIG. 19 to the right, schematically depicts effective point spread functions 1916 to 1920 that result from registration, deconvolution and fusion of images acquired with respective illumination point spread functions indicated with a dashed line.

The point spread function describes how an optical system images a point object and determines the optical systems spatial resolution. As can be seen in a first row, the point spread functions 1900, 1904 of a typical confocal laser scanning microscope and a respective detection optic are ellipsoid and elongated along the optical axis of the detection optic, i.e. the z-axis. This means that the Z or axial-resolution is lower than X-Y or lateral resolution. A second row shows an illumination light distribution 1902 in comparison to the detection point spread function 1904 of a single detection optic 114 in case of a light sheet illumination. As can be seen in FIG. 19, the illumination light distribution is much bigger than the detection point spread function, and thus, the effective resolution is determined by the detection point spread function 1904.

A third row shows the point spread functions 1904, 1906 of two detection optics whose object planes 116, 306 intersect within the sample 102. The point spread functions 1904, 1906 of the two detection optics 114, 304 overlap and can therefore be combined into a single effective point spread function 1918 by means of registration, deconvolution and fusion of the individual images. The effective point spread function 1918 then comprises the intersection of the two individual point spread functions 1904, 1906. A can be seen in FIG. 19, the effective point spread function 1918 is approximately cube-shaped.

Using even more detection optics, for example six detection optics as shown in the fourth row, will result in an effective point spread function 1920 that approximates a sphere. Having a spherical effective point spread function corresponds to an isometric resolution, i.e. a comparable spatial resolution in all directions that is approximately equal to the lateral resolution of a single detection optic 114.

Figure 20:
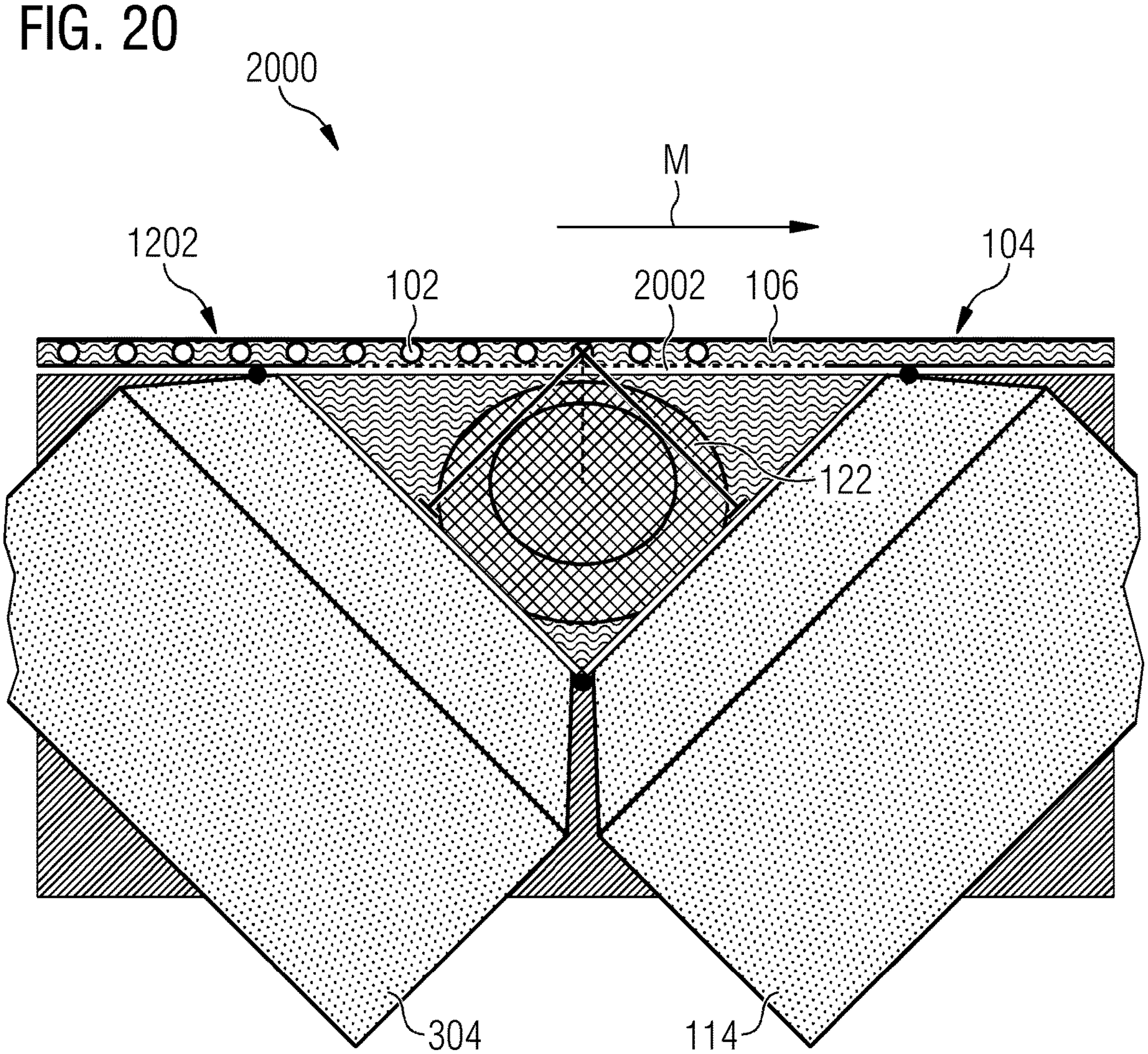
FIG. 20 is a schematic view of an imaging system according to another embodiment.

FIG. 20 is a schematic view of an imaging system 2000 according to another embodiment.

The imaging system 2000 according to FIG. 20 is distinguished from the imaging system 300 according to FIG. 3 in that the first and second detection optics 114, 304 as well as the illumination optic 122 are arranged below the flow cell 104. The flow cell 104 comprises a single window portion 2002 at which all three optics 114, 122, 304 are directed. The optical axes O1, O2, O3 of the three optics 114, 122, 304 enclose an angle of about 90° with each other. The optical axes O1, O3 of the first and second detection optics 114, 304 enclose an angle of about 45° with the movement direction M. The optical axis O2 of the illumination optic 122 encloses an angle of about 90° with the movement direction M. Because all three optics 114, 122, 304 are arranged below the flow cell 104, all three optics 114, 122, 304 are below a plane in which the movement of the samples 102 takes place. This has the advantage, that larger sample carriers may be used instead of a flow cell 104, as will be described in the following with reference to FIG. 21.

Figure 21:
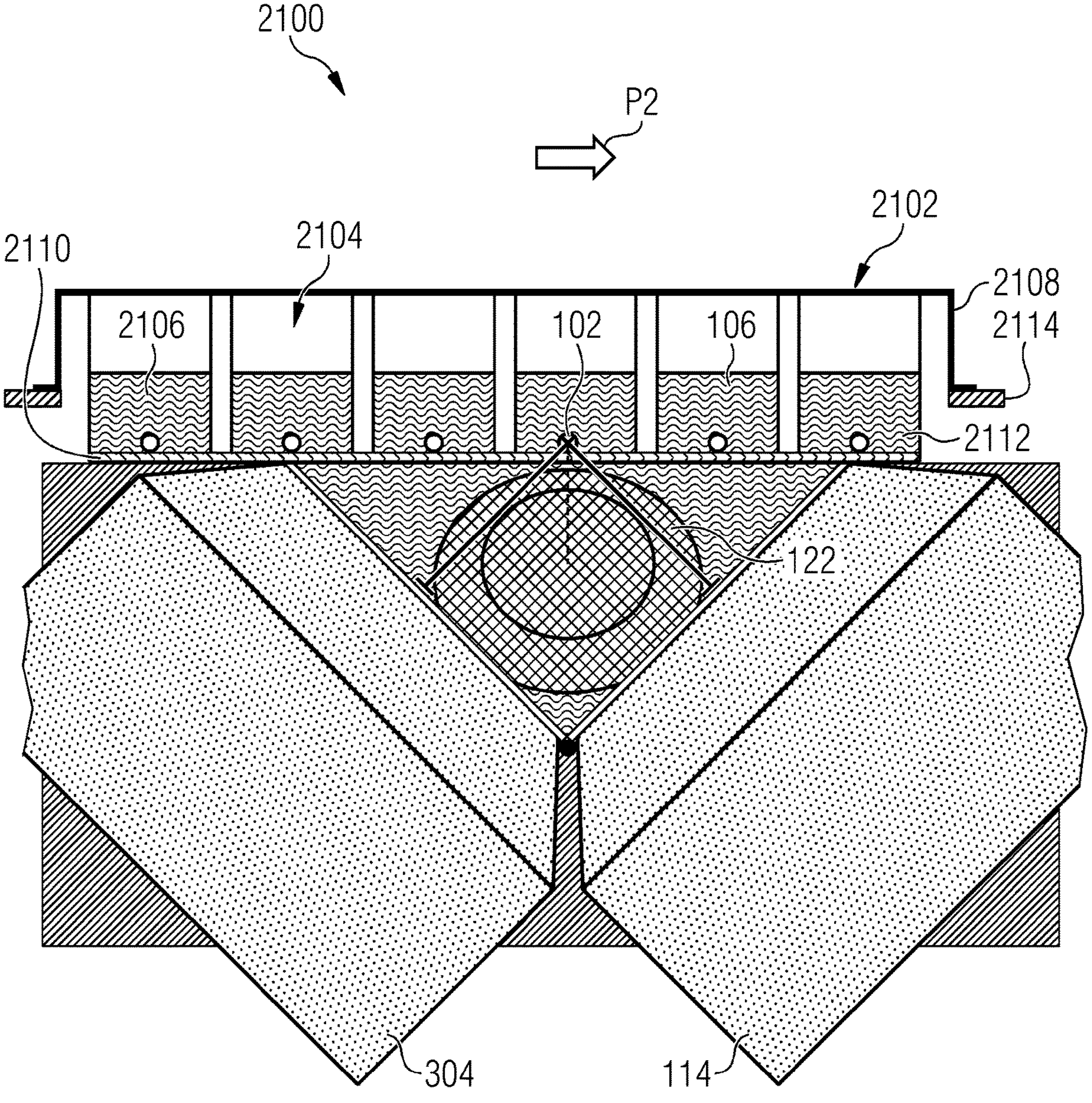
FIG. 21 is a schematic view of an imaging system according to another embodiment.

FIG. 21 is a schematic view of an imaging system 2100 according to another embodiment.

The imaging system 2100 according to FIG. 21 is distinguished from the imaging system 2000 according to FIG. 20 in that a sample carrier 2102 is used instead of a flow cell 104. The sample carrier 2102 comprises several wells 2104 defining the sample space 106. The wells 2104 are filled with an optical medium 2106, also called embedding medium, in which the samples 102 are received. The sample carrier 2102 further comprises a cover 2108 for covering the wells 2104 from the top. A bottom portion 2110 of the sample carrier 2102 is formed as an optically transparent window portion 2112 for observing the samples 102 from below.

The sample carrier 2102 is received on a motorized microscope table 2114 that is exemplary formed as a x-y table. In the present embodiment, the microscope table 2114 forms the sample moving unit. By moving the sample carrier 2102 by means of the microscope table 2114, the samples 102 are moved relative to the first and second detection optics 114, 304. Thus, the movement of the microscope table 2114 defines the movement direction M of the samples 102 that is shown in FIG. 21 as an arrow P2.

In the present embodiment, the sample carrier 2102 is exemplary formed as a microplate. The sample carrier 2102 may also be formed as a petri-dish, a microscope slide, a chamber slide or any other suitable sample carrier geometry.

Figure 22:
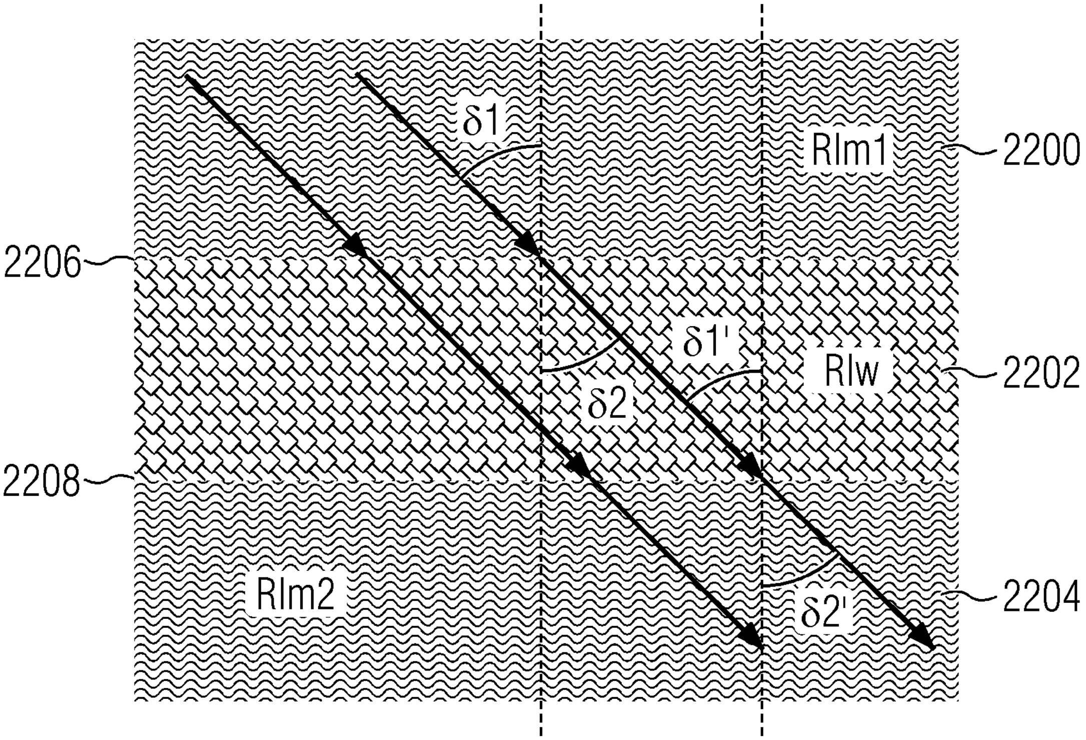
FIG. 22 is a schematic view of the window portion of a flow cell or sample carrier for use with the imaging system according to an embodiment.

FIG. 22 is a schematic view of the window portion of a flow cell 104 or sample carrier 2102 for use with the imaging system 100, 300, 800, 900, 2000, 2100 according to an embodiment.

The samples 102 are embedded in a first optical medium 2200, for example an embedding medium or a flow medium, that is arranged above a window portion 2202 in FIG. 22. The first optical medium 2200 has a first refractive index RIm1, for example 1.331 in case the first optical medium 2200 is water. The window portion 2202 of the flow cell 104 or the sample carrier 2102 is made from a material having a second refractive index RIw. The first and second refractive indices are substantially the same, i.e. they do not deviate by more than 2.5%. Therefore, the material of the window portion 2202 will also be referred to as index-matched material and is denoted by a shingle-pattern in FIG. 22. A second optical medium 2204 is arranged below the window portion 2202. The second medium fills the space between a lower surface of the window portion 2202 and a front lens of the detection optic 114, 304. The second optical medium 2204 may be an immersion medium, in particular the same medium as the first optical medium 2200, or air.

Optical interfaces 2206, 2208 are formed at the boundary where the window portion 2202 made from the index-matched material touches the first optical medium 2200, and the second optical medium 2204 respectively. In FIG. 22 the second optical medium 2204 is exemplary the same medium as the first optical medium 2200, i.e. water, or has a refractive index Rlm2 close the first refractive. A first optical interface 2206 is formed at the boundary between the window portion 2202 and the first optical medium 2200. A second optical interface 2208 is formed at the boundary between the window portion 2202 and the second optical medium 2204.

Two parallel light rays propagate from the top through the first optical medium 2200, the window portion 2202, and the second optical medium 2204 in that order. Since the refractive indices Rlm1, Rlm2 of the first and second optical medium 2204, are essentially equal to the refractive index Rlw of the window portion 2202, the light rays are not or only slightly refracted at the first and second optical interfaces. In the case the refractive indices Rlm1, Rlm2, Rlw do not deviate by more than 2.5%, the resulting spherical aberrations and coma are so mild that they can still be corrected computationally. Preferably, the first optical medium 2200, the window portion 2202, and/or the second optical medium 2204 are selected such that the dispersion of these items are similar or (almost) identical to each other as well.

Typically, optical interfaces result in aberrations, in particular spherical aberrations. The negative effects of the optical interface are even stronger when the sample 102 is imaged at an oblique angle, as is the case with the proposed imaging system 100. Typically, a tilt of the optical axis O1 of the detection optic 114 will lead to the rapid degradation of the image, in particular loss of intensity, coma, spherical aberration and chromatic aberrations. However, the aforementioned negative effects of the optical interface are mainly caused by a difference in refractive indices between the two mediums forming the optical interface. Since the refractive indices of the window portion 2202 and the optical medium 2106 do not deviate by more than e.g. 2.5%, the negative effects of the optical interface are greatly reduced. Thus, the sample carrier 2102 or the flow cell 104 according to the present embodiment is well suited for use with the imaging system 100 described above.

Identical or similarly acting elements are designated with the same reference signs in all Figures. As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Imaging system
102 Sample
104 Flow cell
106 Sample space
108, 110 Window portion
112 Optical detection system
114 Detection optic
116 Object plane
118 Tube lens
120 Detector element
122 Illumination optic
200, 202 Plane
300 Imaging system
302 Optical detection system
304 Detection optic
306 Object plane
400, 402 Light sheet
500 Light sheet illumination unit
502 Light source
504 Beam splitter
506 Beam
508 Chopper wheel
510 Scanning mirror
512, 514 Light sheet forming unit
516 Mirror
518 Beam splitter
520 Mirror
700 Hole
702 Mirror
800 Imaging system
802, 804 Optical detection system

806, 808 Detection optic
900 Imaging system
902 Illumination optic
1000 Light sheet illumination unit
1002 Light sheet forming unit
1004 light sheet
1006 Light sheet forming unit
1008 Mirror
1010 Light sheet
1200 Light sheet illumination unit
1202 Chopper wheel
1600 Light sheet illumination unit
1602, 1604 Chopper wheel
1606, 1608 Spatial light modulating element
1700 Light sheet illumination unit
1702 Beam splitter
1800 to 1814 Graph
1900 to 1920 Point spread function
2000 Imaging system
2100 Imaging system
2102 Sample carrier
2104 Wells
2106 Optical medium
2108 Cover
2110 Bottom portion
2112 Window portion
2114 microscope table
2200 Optical medium
2202 Window portion
2204 Optical medium
2206, 2208 Optical interface
M movement direction
O1, O2, O3, O4 optical axis
P1, P2 Arrow

The invention claimed is:

1. An imaging system for imaging a sample, comprising:

a sample moving unit configured to move the sample in a sample space along a movement direction;

at least one detection optic comprising a detection optical axis that encloses a first angle with the movement direction within a range of 20° to 70°, the detection optical axis of the at least one detection optic and the movement direction defining a first plane; and at least one illumination optic comprising:

an illumination optical axis that encloses a second angle with the movement direction within a range of 70° to 110°, and that encloses a third angle with the detection optical axis of the at least one detection optic within a range of 70° to 110°, the illumination optical axis of the at least one illumination optic and the movement direction defining a second plane, the first and second planes intersecting and being different, a first illumination optic, and a second illumination optic, wherein a second illumination optical axis of the second illumination optic encloses a seventh angle with the movement direction within a range of 70° to 110°, and encloses an eighth angle with the illumination optical axis of the first illumination optic being smaller than 20°.

2. The imaging system according to claim 1, wherein the illumination optical axis of the at least one illumination optic is perpendicular to the detection optical axis of the at least one detection optic, and perpendicular to the movement direction.

3. The imaging system according to claim 1, wherein the at least one detection optic further comprises a second detection optic and a first detection optic, wherein a first object plane of the first detection optic and a second object plane of the second detection optic intersect within the sample space.

4. The imaging system according to claim 3, wherein a second detection optical axis of the second detection optic encloses a fourth angle with the movement direction within a range of 20° to 70°, encloses a fifth angle with the detection optical axis of the first detection optic within a range of 70° to 110°, and encloses a sixth angle with the illumination optical axis of the at least one illumination optic within a range of 70° to 110°.

5. The imaging system according to claim 1, wherein the first and second illumination optics are arranged opposite each other.

6. The imaging system according to claim 1, further comprising a light sheet illumination unit configured to generate at least one light sheet by directing illumination light through the at least one illumination optic into the sample space for illuminating an object plane of the detection optic.

7. The imaging system according to claim 6, wherein the at least one detection optic further comprises a first detection optic and a second detection optic, and wherein the light sheet illumination unit is further configured to generate a second light sheet by directing illumination light through the at least one illumination optic into the sample space, and to alternatingly illuminate a first object plane of the first detection optic with the first light sheet and illuminate a second object plane of the second detection optic with the second light sheet.

8. The imaging system according to claim 7, wherein the light sheet illumination unit is further configured to alternatingly direct illumination light through the first illumination optic into the sample space for illuminating the first or second object plane of the first or second detection optics with the first or second light sheet, and through the second illumination optic into the sample space for the illuminating the first or second object plane of the first or second detection optic with the first or second light sheet.

9. The imaging system according to claim 1, wherein the at least one detection optic comprises an immersion objective.

10. The imaging system according to claim 1, wherein the first plane and the second plane intersect within the sample space.

11. The imaging system according to claim 1, wherein the sample moving unit comprises a flow cell defining the sample space.

12. The imaging system according to claim 1, wherein the sample moving unit comprises a movable microscope table; and wherein the sample space is defined by a sample carrier arranged on or at the microscope table.

13. The imaging system according to claim 11, wherein a sample carrier or the flow cell comprises an optical medium in which the sample is received, the optical medium having a first refractive index; wherein the sample carrier or the flow cell further comprises at least one window portion defining two parallel surfaces that comprises an optically transparent material having a second refractive index, and that is arranged at a bottom side of the sample carrier; and wherein the first and second refractive indices do not deviate by more than 2.5%.

14. The imaging system according to claim 1, wherein the imaging system is a microscope or an imaging cytometer.

15. A method for imaging a sample by means of an imaging system, comprising:

moving the sample in a sample space along a movement direction;

illuminating the sample with at least one illumination optic having an illumination optical axis that encloses a first angle with the movement direction within the range of 70° to 110°, and that encloses a second angle with the detection optical axis of at least one detection optic within the range of 70° to 110°, wherein the at least one illumination optic comprises a first illumination optic and a second illumination optic, and wherein a second illumination optical axis of the second illumination optic encloses a seventh angle with the movement direction within a range of 70° to 110°, and encloses an eighth angle with the illumination optical axis of the first illumination optic being smaller than 20°; and capturing at least one image of the sample with the at least one detection optic having the detection axis that encloses a third angle with the movement direction within the range of 20° to 70°;

wherein the detection optical axis of the at least one detection optic and the movement direction define a first plane; wherein the illumination optical axis of the at least one illumination optic and the movement direction define a second plane; and wherein the first and second planes intersect and are different.

16. The imaging system according to claim 1, wherein the sample moving unit comprises a motorized microscope table; and wherein the sample space is defined by a sample carrier arranged on or at the motorized microscope table.

17. An imaging system for imaging a sample, comprising:

a sample moving unit configured to move the sample in a sample space along a movement direction;

at least one detection optic comprising:

a detection optical axis that encloses a first angle with the movement direction within a range of 20° to 70°, the detection optical axis of the at least one detection optic and the movement direction defining a first plane, a first detection optic, and a second detection optic;

at least one illumination optic comprising an illumination optical axis that encloses a second angle with the movement direction within a range of 70° to 110°, and that encloses a third angle with the detection optical axis of the at least one detection optic within a range of 70° to 110°, the illumination optical axis of the at least one illumination optic and the movement direction defining a second plane, the first and second planes intersecting and being different; and a light sheet illumination unit configured to:

generate at least one first light sheet by directing illumination light through the at least one illumination optic into the sample space for illuminating an object plane of the detection optic, generate a second light sheet by directing the illumination light through the at least one illumination optic into the sample space, and alternatingly illuminate a first object plane of the first detection optic with the first light sheet and illuminate a second object plane of the second detection optic with the second light sheet.

18. An imaging system for imaging a sample, comprising:

a sample moving unit configured to move the sample in a sample space along a movement direction;

at least one detection optic comprising a detection optical axis that encloses a first angle with the movement direction within a range of 20° to 70°, the detection optical axis of the at least one detection optic and the movement direction defining a first plane;

at least one illumination optic comprising an illumination optical axis that encloses a second angle with the movement direction within a range of 70° to 110°, and that encloses a third angle with the detection optical axis of the at least one detection optic within a range of 70° to 110°, the illumination optical axis of the at least one illumination optic and the movement direction defining a second plane, the first and second planes intersecting and being different; and a light sheet illumination unit configured to:

generate at least one first light sheet by directing illumination light through the at least one illumination optic into the sample space for illuminating an object plane of the at least one detection optic, and alternatingly direct the illumination light through a first illumination optic into the sample space for illuminating an object plane of the at least one detection optic with the at least one first light sheet, and through a second illumination optic into the sample space for illuminating the object plane of the at least one detection optic with the at least one first light sheet.

19. An imaging system for imaging a sample, comprising:

a sample moving unit configured to move the sample in a sample space along a movement direction, and wherein the sample moving unit comprises a sample carrier or a flow cell defining the sample space;

at least one detection optic comprising a detection optical axis that encloses a first angle with the movement direction within a range of 20° to 70°, the detection optical axis of the at least one detection optic and the movement direction defining a first plane; and at least one illumination optic comprising an illumination optical axis that encloses a second angle with the movement direction within a range of 70° to 110°, and that encloses a third angle with the detection optical axis of the at least one detection optic within a range of 70° to 110°, the illumination optical axis of the at least one illumination optic and the movement direction defining a second plane, the first and second planes intersecting and being different, wherein the sample carrier or the flow cell comprises an optical medium in which the sample is received, the optical medium having a first refractive index, wherein the sample carrier or the flow cell further comprises at least one window portion defining two parallel surfaces that comprises an optically transparent material having a second refractive index, and that is arranged at at least one of a front side or a back side or a bottom side of the sample carrier, and wherein the first and second refractive indices do not deviate by more than 2.5%.

* * * * *